(12) United States Patent
Lybrook et al.

(10) Patent No.: US 8,775,233 B1
(45) Date of Patent: Jul. 8, 2014

(54) TELECOM ENVIRONMENT MANAGEMENT OPERATING SYSTEM AND METHOD

(75) Inventors: Timothy C. Lybrook, Bloomington, IN (US); Timothy C. Colwell, Bloomington, IN (US)

(73) Assignee: Evotem, LLC, Indianapolis, IN (US)

( * ) Notice: Subject to any disclaimer, the term of this patent is extended or adjusted under 35 U.S.C. 154(b) by 1144 days.

(21) Appl. No.: 12/387,512

(22) Filed: May 4, 2009

Related U.S. Application Data

(60) Provisional application No. 61/126,240, filed on May 2, 2008.

(51) Int. Cl.
| | |
|---|---|
| *G06Q 10/00* | (2012.01) |
| *G06Q 10/06* | (2012.01) |
| *G06N 5/04* | (2006.01) |
| *G06N 5/02* | (2006.01) |

(52) U.S. Cl.
CPC .......... *G06Q 10/06393* (2013.01); *G06N 5/046* (2013.01); *G06Q 10/067* (2013.01); *G06Q 10/06375* (2013.01); *G06N 5/02* (2013.01); *G06Q 10/0639* (2013.01); *Y10S 707/99933* (2013.01)
USPC ....... 705/7.39; 705/7.38; 705/7.37; 705/7.36; 705/348; 706/52; 706/46; 707/E17.108; 707/999.003

(58) Field of Classification Search
CPC ... G06N 5/046; G06N 5/02; G06Q 10/06375; G06Q 10/0639; G06Q 10/06393
USPC .......... 706/52, 46; 707/E17.108, 3, 999.003; 705/7.37, 7.38, 7.39
See application file for complete search history.

(56) References Cited

U.S. PATENT DOCUMENTS

| | | | | |
|---|---|---|---|---|
| 6,007,340 | A * | 12/1999 | Morrel-Samuels | 434/236 |
| 6,157,808 | A * | 12/2000 | Hollingsworth | 434/350 |
| 6,275,812 | B1 * | 8/2001 | Haq et al. | 705/7.14 |
| 6,341,267 | B1 * | 1/2002 | Taub | 705/7.14 |
| 6,459,787 | B2 * | 10/2002 | McIllwaine et al. | 379/265.06 |
| 7,181,413 | B2 * | 2/2007 | Hadden et al. | 705/7.42 |
| 7,367,808 | B1 * | 5/2008 | Frank et al. | 434/219 |
| 7,483,842 | B1 * | 1/2009 | Fung et al. | 705/7.14 |
| 7,499,890 | B1 * | 3/2009 | Allen | 705/400 |
| 7,774,743 | B1 * | 8/2010 | Sanchez et al. | 717/103 |
| 7,783,513 | B2 * | 8/2010 | Lee | 705/7.42 |
| 7,974,870 | B2 * | 7/2011 | Ikezawa | 705/7.38 |
| 8,005,706 | B1 * | 8/2011 | Cassone et al. | 705/7.28 |
| 8,046,254 | B2 * | 10/2011 | Kosiba et al. | 705/7.38 |
| 2001/0032120 | A1 * | 10/2001 | Stuart et al. | 705/11 |
| 2002/0062242 | A1 * | 5/2002 | Suzuki | 705/10 |
| 2003/0023470 | A1 * | 1/2003 | Labbi | 705/7 |
| 2003/0078804 | A1 * | 4/2003 | Morrel-Samuels | 705/1 |
| 2003/0101091 | A1 * | 5/2003 | Levin et al. | 705/11 |
| 2004/0015375 | A1 * | 1/2004 | Cogliandro | 705/7 |
| 2004/0133439 | A1 * | 7/2004 | Noetzold et al. | 705/1 |

(Continued)

OTHER PUBLICATIONS

AOTMP, Telecom environment, archives org webpages, Apr. 2007.*

(Continued)

*Primary Examiner* — Justin M Pats
*Assistant Examiner* — Octavian Rotaru
(74) *Attorney, Agent, or Firm* — Faegre Baker Daniels LLP

(57) ABSTRACT

A telecommunications environment management operating system and method is provided. The system and method helps organizations achieve and sustain optimal financial, operational and technical performance in the field of telecommunications.

16 Claims, 24 Drawing Sheets

(56) References Cited

U.S. PATENT DOCUMENTS

| | | |
|---|---|---|
| 2005/0091071 A1* | 4/2005 | Lee .................................. 705/1 |
| 2006/0200395 A1* | 9/2006 | Masuyama et al. ............. 705/35 |
| 2007/0124161 A1* | 5/2007 | Mueller et al. .................... 705/1 |
| 2007/0195944 A1* | 8/2007 | Korenblit et al. ........ 379/265.06 |
| 2007/0254628 A1* | 11/2007 | Rybak .......................... 455/405 |
| 2007/0271198 A1* | 11/2007 | Del Bianco et al. ............ 705/36 |
| 2007/0288297 A1* | 12/2007 | Karras et al. .................... 705/10 |
| 2008/0071609 A1* | 3/2008 | Yanase et al. ................... 705/11 |
| 2008/0133316 A1* | 6/2008 | Sarkar ............................. 705/10 |
| 2008/0249957 A1* | 10/2008 | Masuyama et al. ............. 705/36 |
| 2009/0048961 A1* | 2/2009 | Mott ................................ 705/37 |
| 2009/0063223 A1* | 3/2009 | Elwell et al. ....................... 705/7 |
| 2009/0070188 A1* | 3/2009 | Scott et al. ...................... 705/10 |
| 2009/0125356 A1* | 5/2009 | Allen ................................. 705/7 |

OTHER PUBLICATIONS

Westnes, P., "What is Intellectual Capital? Defining and describing the concept", Areidsnotat RF, 2005/054, RF-Rogalandsforskning, pp. 1-59, http://www.rf.no.

\* cited by examiner

TELECOM ENVIRONMENT MANAGEMENT OPERATING SYSTEM AND METHOD

CROSS-REFERENCE TO RELATED APPLICATION

This application claims the benefit of U.S. Provisional Patent Application Ser. No. 61/126,240, filed May 2, 2008, the disclosure of which, including the Exhibits filed with the provisional application, is expressly incorporated by reference herein.

BACKGROUND AND SUMMARY

The present invention relates to a Telecommunications Environment Management Operating System (TEMOS). TEMOS is a system and method for achieving and sustaining optimal financial, operational and technical performance in the field of telecommunications.

TEMOS includes standards and best practices, processes and measures for effectively managing enterprise financial, operational and technical objectives. Standards and best practices addressing the management of seven core areas of focus form the foundation of telecommunication environment management and are represented in a Telecom Environment Management Model (TEMM). Resource management, process management, technical management, asset management, project management, relationship management and financial management are seven illustrated core areas of focus within TEMOS. TEMOS implements standards and best practices; measures performance against market leaders, market peers, and internal benchmarks; and establishes action plans to meet desired objectives. In an illustrated embodiment, enterprise performance measurements are made using a scoring system that quantifies performance against a scale illustrating the degree of optimal performance attained across all telecom environment management practices.

An illustrated embodiment of the present disclosure relates to telecommunications environment management business processes, specifically a system and method for achieving and maintaining optimal financial, operational and technical performance in the field of telecommunications. Telecom applications and services continue to grow in necessity and prevalence as technology and organizational communications needs evolve. Spending for these telecommunication services will grow in conjunction with increased service penetration. Increases in spending focuses the need for organizations to increase financial and operational management control over the performance and cost of telecommunication services.

The need for control has led organizations to establish and deploy internal key performance indicators (KPIs) to monitor and adjust the performance of telecom cost against services. KPIs have been created to track a multitude of management points, such as:

Telecom cost per employee
Telecom cost against revenue
Telecom cost against operating expenses
Telecom cost per location
Telecom cost per business unit
Percentage of new contract rate increase/decrease against previous contracts These KPIs, as well as other KPIs unique to each organization, create and support a self-contained management environment allowing cost trend analysis and comparative analysis against past cost performance projections. A challenge for organizations is managing the cost of telecommunication services and service delivery proactively. This is particularly true when considering the scope of budget planning and performance evaluation activities. Developing and monitoring self-contained KPIs provides some measure of budget performance response. However, KPIs measured against themselves, not against benchmarks of excellence, leave room for performance interpretation open for each organization. The lack of KPI measurement against standards and current market benchmark metrics leaves a management void. A distinct market need exists for a suite of benchmark standards that enable organizations to migrate telecommunication management practices from subjective self-review to an objective analysis. The Telecom Environment Management Operating System (TEMOS) of the present disclosure fills this need and provides customers with a standards tool for implementing and benchmarking telecom environment management metrics.

One financial pressure felt by telecom professionals is to optimize and reduce the cost of telecom. This pressure increases in proportion to increased consumption. Simple price point reductions are no longer adequate for achieving cost reduction demands.

Cost reduction demands feed the second dominant telecom pressure—resource limitations. Financial, operational and technical telecom professionals have declined over time. More is asked of professionals in today's telecom environment and the complexities of functional and management activities have increased over time as technology and flexibility has proliferated in the telecom market. In direct relation to financial management demands, telecom professionals are required to become more skilled in achieving established financial objectives. The absence of proper skills and/or adequate resources does not, however, alleviate financial pressures or expectations. The net result is pain and frustration experienced by telecom professionals as they strive to meet organizational demands with limited resources.

The demand for financial optimization is an ever-present driver even in cases in which financial objectives for previous periods have been met. This introduces another challenge for telecom professionals and organizations alike, as expectations driven purely by need that are not balanced against attainable industry benchmarks create a situation where financial needs may be unrealistic or unachievable while maintaining the same quantity of services and technology.

The industry as a whole lacks definitive standards for environment management and benchmarks for measuring success toward achieving financial and operational excellence. Internal objectives not measured against best practices and industry benchmarks are myopic in scope and incomplete against true measures of achievement.

TEMOS delivers tools, standards and best practices, and performance services focused on driving optimal performance in enterprise telecom environments. TEMOS provides an online portal application that aggregates information and resources needed for enterprises to attain optimal performance across financial, operational and technical objectives. A Metrics Manager and Recommendation Generator are hardware/software modules used to deliver TEMOS. TEMOS also includes a data collector that captures performance metrics that measures predictive and process performance based on enterprise user inputs. Performance measurements are dynamic across three strata: internal performance, market peer performance and market excellence performance as discussed below.

Internal performance is the measurement of current state predictive performance and process performance metrics. Predictive performance measurements illustratively include Skills Assessments and Environment Assessments. Each measurement captures data responses from individuals functioning within a telecom environment, measures responses against standards and best practices and scores the responses. Scored responses are aggregated into an overall score for individual Skills Assessment topics or the Environment Assessment evaluation. Aggregate scores are measured against a probability scale which provides an indication of the probability of optimal performance by an organization within the telecom environment. Successive Skills Assessments and Environment Assessments are measured similarly and compared against previous scores.

The practice of measuring predictive performance on a continuum allows for progress or regress to be identified and quantified. Process performance metrics are measured in terms of standards and best practices process cycle time, accuracy and reliability. Each process within TEMM methodology is designed to maximize process performance results. Cycle time is measured in terms of individual effort exerted to complete a process and elapsed time, as these measures have a direct bearing on cost of environment management practices and financial value afforded the processes. Accuracy and reliability of process performance are measured to provide a complete representation of the value of optimal performance in financial terms. Processes with optimal cycle time and low reliability and accuracy are of less financial value than processes with optimal cycle time and high reliability and accuracy. The practice of measuring process performance on a continuum allows for progress or regress to be identified and quantified.

Market peer performance measurements evaluate individual predictive performance and process performance against market peers with similar demographics. The data collector within TEMOS indexes predictive performance and process performance results against certain enterprise demographics, including but not limited to:

Industry Segment
Quantity of Locations
Enterprise Sales Revenue
Enterprise Employee Count
Enterprise Workforce Profile (Office/Field)
Monthly & Annual Telecom Spend (Voice, Data, Wireless)
Geographic Profile (State, Country)
Service Profile (Voice, Data, Wireless)

Market excellence performance in TEMOS is an individual predictive measure, an environment predictive measure or a process performance measure scoring 90% or greater against AOTMP's standardized performance scale.

According to an illustrated embodiment of the present disclosure, a method of predicting a probability of optimal performance within a telecommunications environment for an organization comprises measuring a predictive performance by assessing skills of telecom personnel within an organization and assessing a telecom environment of the organization; comparing the skills assessments and the environment assessments to standards and best practices within the telecommunications industry; generating scores for the skills assessments and the environment assessments based on the comparing step; aggregating scores from the skills assessments and environment assessments to provide an overall score; and determining a probability of optimal performance in a telecommunications environment for the organization based on the overall score.

In an illustrated embodiment, the environment assessments include assessments in the areas of resource management, process management, technical management, asset management, project management, relationship management, and/or financial management. Illustratively, the skills assessments are predictive indicators that measure the probability that telecom personnel have the skills and knowledge required to achieve optimal performance and the environment assessments are predictive indicators that measure the probability that processes within the organization are present to support telecom personnel in their efforts to achieve optimal performance.

According to another illustrated embodiment of the present disclosure, a system is provided for recommending improvements to an organization's telecommunication environment to a computing device via a communication network. The system includes a computer server operably connected to the computing device through the communication network, a memory accessible by the computer server, and a database stored in the memory. The database includes a plurality of recommendations for telecommunication environment improvements made by analysts and a plurality of telecommunication environment factors considered by the analysts when making the recommendations. The system also includes a recommendation generator software module stored in the memory and executable by the computer server, the recommendation generator module being operable to automatically receive a plurality of telecommunication environment factors from an organization via the computing device; automatically store the plurality of factors received from the organization in the memory; automatically compare the stored factors received from the organization to the stored factors and recommendations in the database; automatically generate at least one recommendation for an improvement to the organization's telecommunication environment based on the comparison; and automatically transmit the at least one recommendation from the computer server to the computing device via the communication network.

In an illustrated embodiment, the recommendation generator module is further operable to automatically identify factors stored in the database that establish conditions determining when a recommendation was made by the analysts; automatically determine a Boolean logic relationship between the identified factors and the recommendation; automatically analyze the organization's data received from the computing device with the computer server to determine the telecommunication environment factors that are present; and automatically apply the Boolean logic to the organization's factors received from the computing device to determine the at least one recommendation.

Also in an illustrated embodiment, the recommendation generator software module further uses a Bayesian analysis of the factors to determine when a recommendation is made. Illustratively; the recommendation generator software module is further operable to automatically calculate a probability that a particular recommendation should be included as part of an overall recommendation of improvements to the organization's telecommunication environment, and automatically send the probability to the computing device along with the recommendation for display on a display of the computing device. The recommendation generator software module is further operable to automatically receive an input from the computing device accepting the particular recommendation and to automatically add an accepted recommendation to the database stored in the memory upon receiving the input from the computing device accepting the particular recommendation.

According to yet another illustrated embodiment of the present disclosure, a method of providing a probability of optimal performance within a telecommunication environment for an organization using data received from an organization's computing device over a communication network includes providing a computer server operably coupled to the computing device through the communication network; providing a memory accessible by the computer server; and storing data related to telecommunications industry standards and best practices in a first database in the memory. The method also includes automatically generating and sending environment assessments related to the organization's telecom environment from the computer server to the computing device via the computer network; automatically receiving data from the computing device in response to the environment assessments; automatically storing the received data related to the environment assessments in a second database linked to the organization; automatically comparing the environment assessment data received from the organization and stored in the second database to the telecommunication industry standards and best practices stored in the first database; and automatically determining with the computer server a probability of optimal performance in the telecommunication environment for the organization based on the comparing step.

In an illustrated embodiment, the step of automatically determining a probability of optimal performance includes automatically calculating scores for a plurality of environment assessments based on the comparing step; automatically aggregating scores from the plurality of environmental assessments to provide an overall score; and automatically determining a probability of optimal performance in the telecommunication environment for the organization based on the overall score.

Additional features of the present invention will become apparent to those skilled in the art upon consideration of the following detailed description of illustrative embodiments exemplifying the best mode of carrying out the invention as presently perceived.

BRIEF DESCRIPTION OF THE DRAWINGS

The detailed description of the drawings particularly refers to the accompanying figures in which:

FIG. 15 is a block diagram illustrating process flow of TEMOS;

DETAILED DESCRIPTION OF THE DRAWINGS

For the purposes of promoting an understanding of the principles of the present disclosure, reference will now be made to certain illustrated embodiments and drawings. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Figure 1:
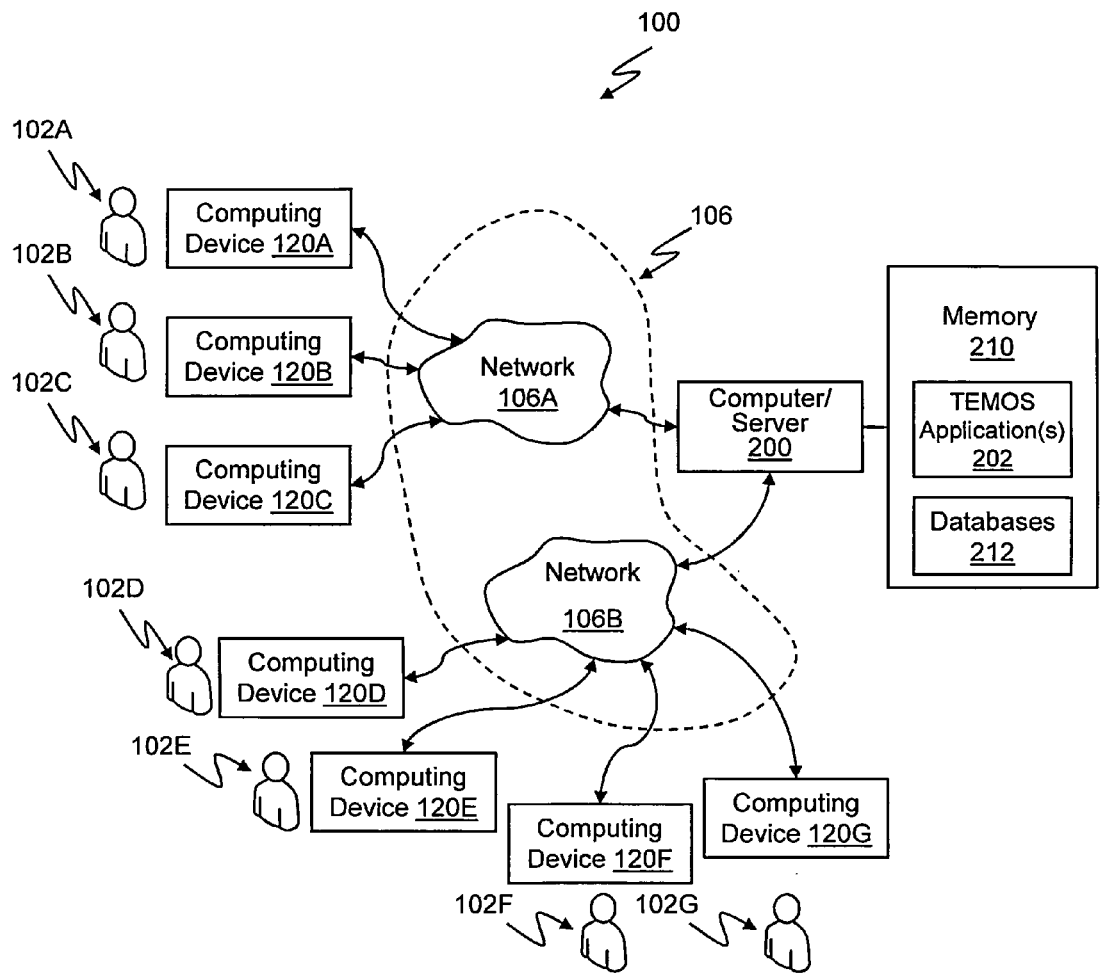
FIG. 1 is a block diagram illustrating components of a Telecommunications Environment Management Operating System (TEMOS) in accordance with an illustrated embodiment of the present invention.

Referring to FIG. 1, a Telecommunications Environment Management Operating System (TEMOS) 100 is illustrated. TEMOS 100 illustratively includes a plurality of clients or customers 102A-102G using client computing devices 120-120E, respectively, to communicate with a computer/server 200 through an electronic communication network 106. Electronic communication network 106 may be a collection of one or more wired or wireless networks.

Illustratively, computing devices 120 may be general purpose computers or portable computing devices. Although computing device 120 is illustrated as a single computing device, it should be understood that multiple computing devices may be used together, such as over a network or other methods of transferring data. Exemplary computing devices 120 include desktop computers, laptop computers, personal data assistants ("PDA"), cellular devices, tablet computers, or other devices capable of the communications discussed herein.

Figure 2:
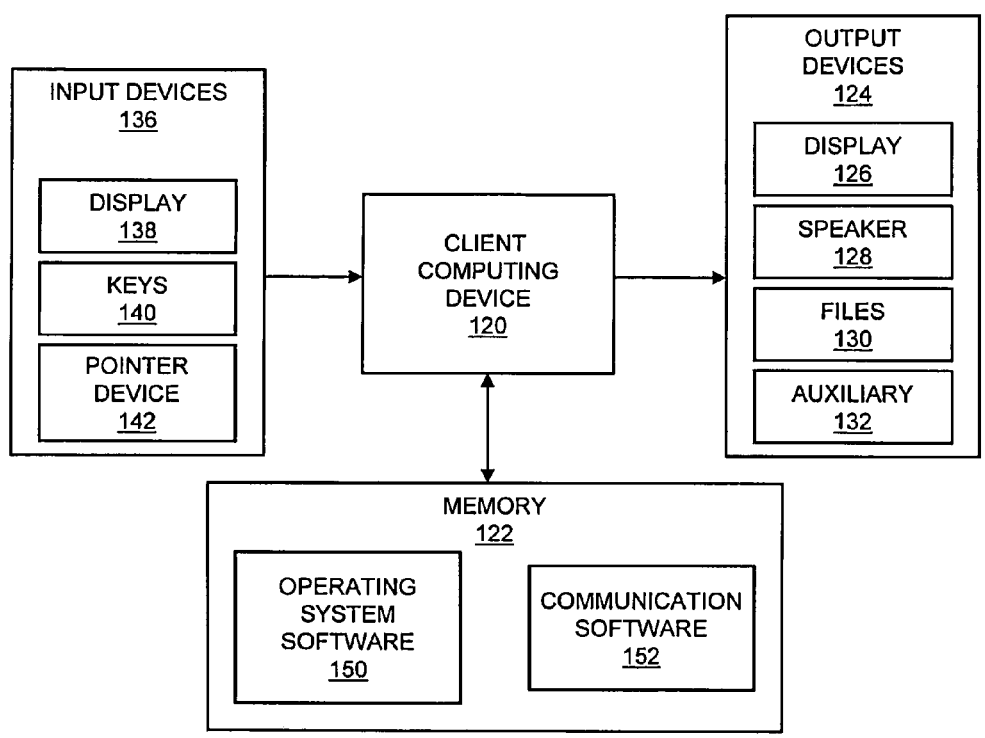
FIG. 2 is a block diagram illustrating components of a client computing device.

Each computing device 120 has access to a memory 122 as illustrated in FIG. 2. Memory 122 is a computer readable medium and may be a single storage device or multiple storage devices, located either locally with computing device 120 or accessible across a network. Computer-readable media may be any available media that can be accessed by the computing device 120 and includes both volatile and non-volatile media. Further, computer readable-media may be one or both of removable and non-removable media. By way of example, and not limitation, computer-readable media may comprise computer storage media. Exemplary computer storage media includes, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which can be used to store information and which can be accessed by the computing device 120.

Computing device 120 has access to one or more output devices 124. Exemplary output devices 124 include a display 126, a speaker 128, a file 130, and an auxiliary device 132. Exemplary auxiliary devices 132 include devices which may be coupled to computing device 120, such as a printer. Files 130 may have various formats. In one embodiment, files 130 are portable document format (PDF) files. In one embodiment, files 130 are formatted for display by an Internet browser, such as Internet Explorer brand browser available from Microsoft Corporation of Redmond, Wash. or the Firefox brand browser available from Mozilla Corporation of Mountain View, Calif., and may include one or more of HyperText Markup Language ("HTML"), or other formatting instructions. In one embodiment, files 130 are files stored in memory 122 for transmission to another computing device and eventual presentation by another output device or to at least to influence information provided by the other output device.

Computing device 120 further has access to one or more input devices 136. Exemplary input devices 136 include a display 138 (such as a touch display), keys 140 (such as a keypad or keyboard), a pointer device 142 (such as a mouse, a roller ball, a stylus), and other suitable devices by which an operator may provide input to computing device 120.

Memory 122 includes operating system software 150. Exemplary operating system software is a WINDOWS operating system available from Microsoft Corporation of Redmond, Wash. An exemplary operating system for mobile devices is the iPhone operating system available from Apple Corporation of Cupertino, Calif. Memory 122 further includes communications software 152. Exemplary communications software 152 includes e-mail software, Internet browser software, and other types of software which permit computing device 120 to communicate with other computing devices across a network 106. Exemplary networks include a local area network, a cellular network, a public switched network, and other suitable networks. An exemplary public switched network is the Internet.

As discussed above and shown in FIG. 1, each of the clients 102A-G are shown with an associated computing device 120A-G, respectively. Of course, a given client 102 may have multiple computing devices 120 through which the client may access a computing device 200 which provides and/or manages a plurality of TEMOS software applications 202 as discussed below. As illustrated, network 106 is shown including a first network 106A and a second network 106B. For example, computing devices 120A-120C may be handheld devices which communicate with computing device 200 through a cellular network 106A while computing devices 120D-120G are computers which communicate with computing device 200 through a public switched network, such as the Internet. In one example, computing devices 120A-120C also communicate with computing device 200 through the Internet, in that the provider of cellular service provides a connection to the Internet.

Computing device 200 is labelled as Computer/Server because it serves or otherwise make's available to computing devices 120A-120G various TEMOS applications 202. In one embodiment, computing device 200 is a web server and the various TEMOS applications 202 include web sites which are served by computing device 200. Although a single server 200 is shown, multiple computing devices may be implemented to function as computing device 200.

Computing device 200 has access to a memory 210. Memory 210 is a computer readable medium and may be a single storage device or multiple storage devices, located either locally with computing device 200 or accessible across a network. Computer-readable media may be any available media that can be accessed by the computing device 200 and includes both volatile and non-volatile media. Further, computer readable-media may be one or both of removable and non-removable media. By way of example, and not limitation, computer-readable media may comprise computer storage media. Exemplary computer storage media includes, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which can be used to store information and which can be accessed by the computing device 200.

The TEMOS applications 202 are stored in memory 210. In addition to the TEMOS applications 202, memory 210 stores one or more databases 212 which are used by the TEMOS applications 202. Computing device 200 is connected to input devices and output devices similar to those discussed above.

Figure 3:
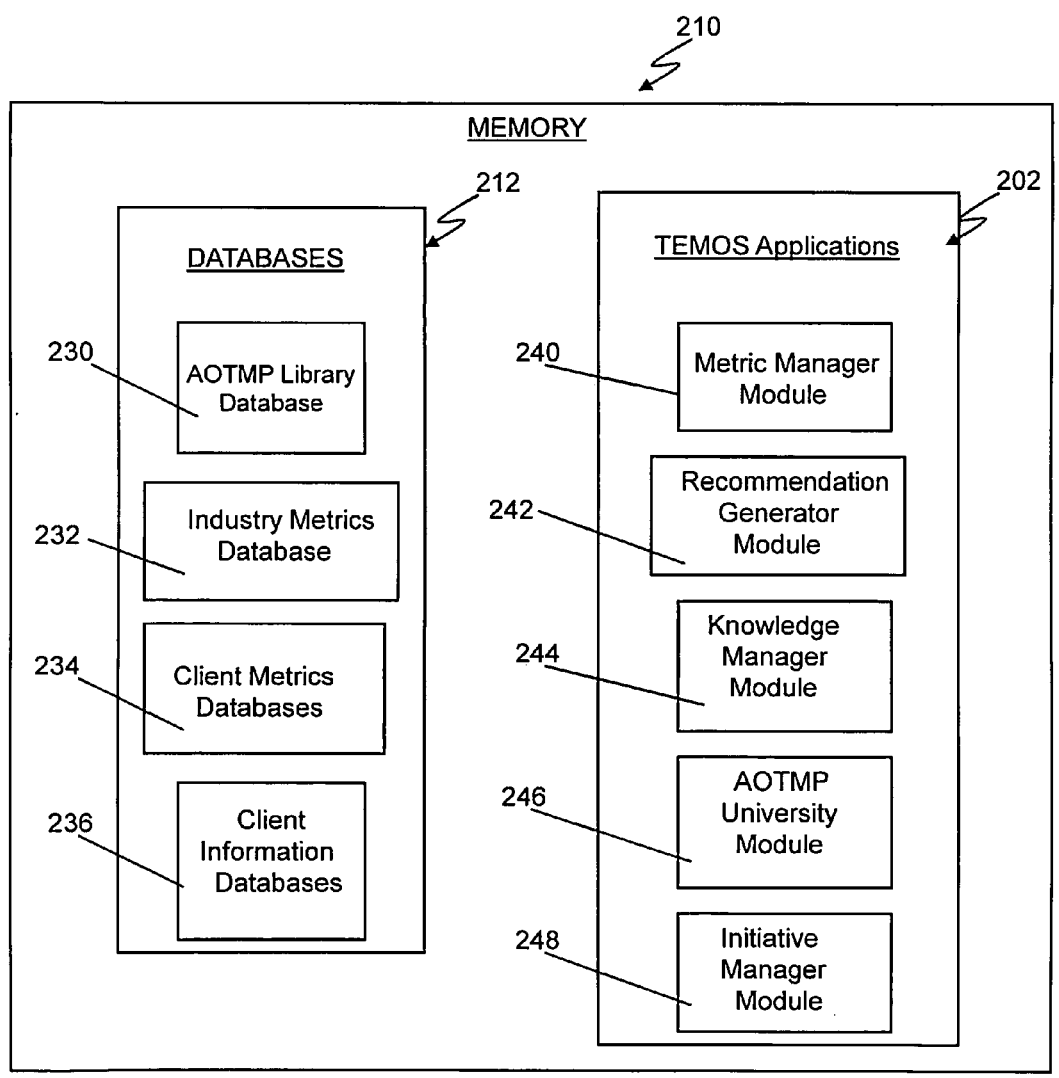
FIG. 3 is a block diagram illustrating a memory coupled to a computer implementing the TEMOS applications, a plurality of databases, and a plurality of software modules stored in the memory.

As illustrated in FIG. 3, TEMOS 100 illustratively includes four primary databases 212 and five primary modules or applications 202. The databases 212 include an AOTMP Library database 230 and an Industry Metrics database 232. These two databases 230, 232 contain the collected knowledge of years measuring, analyzing and implementing performance improvement in telecom management and are available from AOTMP located in Indianapolis, Ind. Two client databases include a Client Metrics database 234 and a Client Information database 236. These two client databases 234, 236 contain the knowledge collected for each client using TEMOS 100.

The Industry Metrics database 232 is a comprehensive collection of telecom metrics used to enable TEMOS to measure aspects of an enterprise's telecom management practices. The metrics provide a measuring stick for an organization's performance.

A Metric Manager module 240 provides a method for dissecting each enterprise's data and computing metrics from the metric data. The Metric Manager module 240 supplies these metrics to the rest of TEMOS where they can be used to measure and analyze aspects of telecom environment management as discussed in detail below.

The AOTMP Library database 230 contains the collected knowledge of telecom management principles, techniques, standards & best practices, and industry knowledge. It provides the information an enterprise needs to improve management practices, stay current with technological advancements and management techniques, and leverage the experience of AOTMP's extensive research and experience in telecom management to attain optimal performance from telecom resources and utilize telecom as a strategic resource.

A Knowledge Manager module 244, an AOTMP University module 246, and an Initiative Manager module 248 automate the support required for TEMOS users to fully realize its benefits. The Initiative Manager module 248 generates initiatives from the recommendations made. It generates education plans for individuals to improve their technical and management skills and project plans for initiatives to improve enterprise management performance. AOTMP University module 246 manages the education plans for individuals, delivers the recommended training and certification programs and administers the Assessments used to measure current performance.

Knowledge Manager Module

Figure 4:
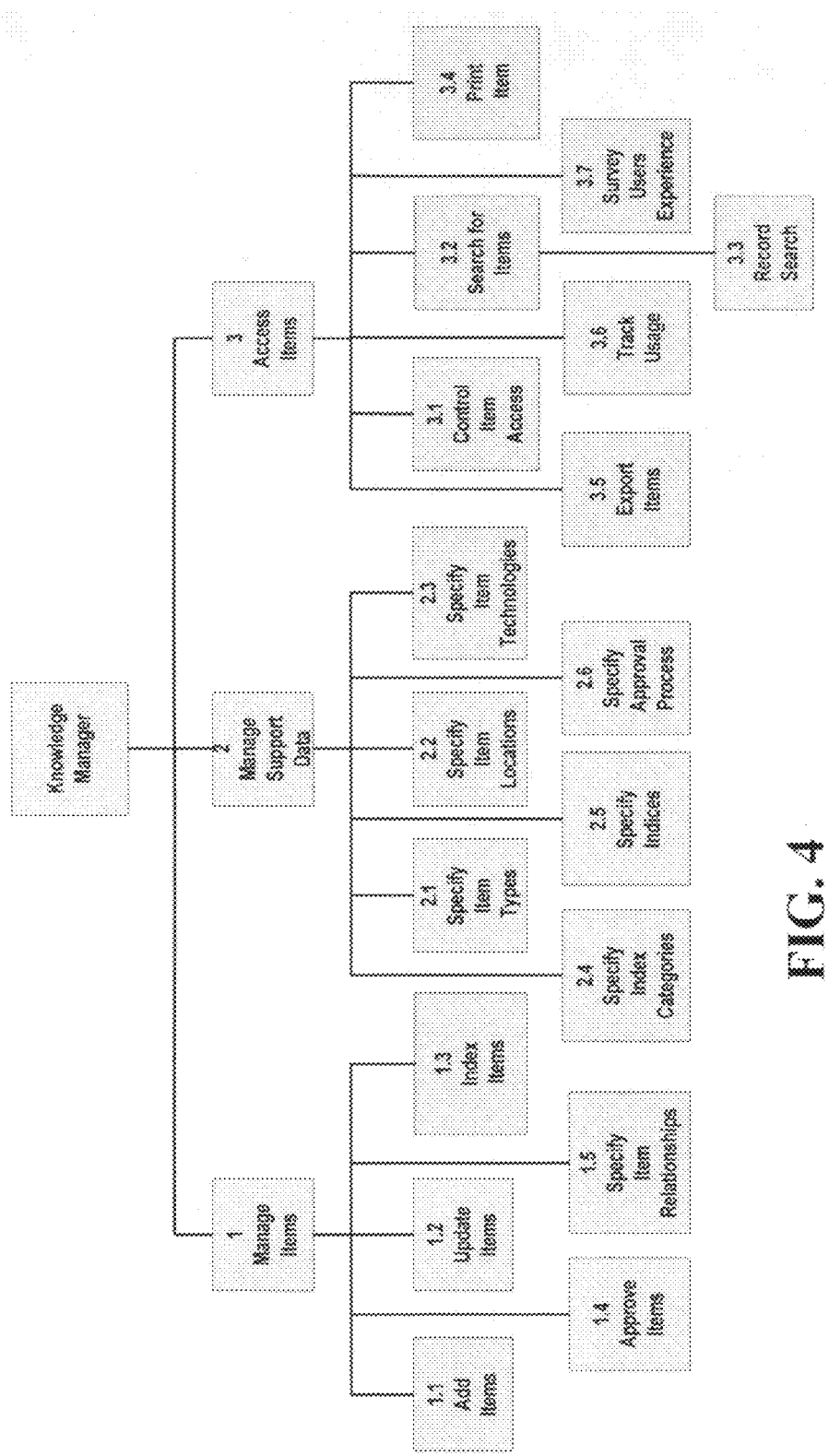
FIG. 4 is a block diagram illustrating functions and features of a Knowledge Manager module.

FIG. 4 is a block diagram illustrating functions and features of the Knowledge Manager module 244. The Knowledge Manager module 244 performs three primary functions. The first is a content management function of managing the content approval process, indexing content, controlling access to content, and providing content per direct request or on instructions for based upon criteria specified by the user.

The second function of the Knowledge Manager module 244 is to coordinate the content between the AOTMP Library database 230 and the client's content in Client Information database 236. This enables TEMOS 100 to compare each client's information to the associated information in the AOTMP Library database 230. For example, TEMOS 100 may display both a client's wireless device acquisition policy and the best practice policy stored in the AOTMP Library database 230 for user analysis.

The third function of the Knowledge Manager module 244 is the management of unique client information about the users and an enterprise's telecom environment. Examples include each user's formal education, years of experience, roles performed, etc.; the enterprise's industry, size (sales & FTEs), organization structure, business goals, and business needs. This information provides factors for determining improvement recommendations.

Further details of the Knowledge Manager module 244 are provided below with reference to FIG. 4. The Knowledge Manager module 244 manages the library of AOTMP's intellectual property utilized by TEMOS and stored in AOTMP Library database 230. This includes maintaining each Item, controlling access to the Items, indexing the Items, providing searches for Items by Indices, and monitoring use of the Items.

As discussed above, Knowledge Manager module 244 performs three primary functions. Numbers below correspond to blocks in FIG. 4.

1 Manage Items
These functions are for the management of the Items in the Knowledge Library and include:
  1.1 Add Items
  Allow Items to be added to the Library.
  Allow Items in any format to be added. This includes MS Word, Excel, PDF's URLS, Powerpoint, RSS, etc.
  Allow links to other items that are either already in the database or not. For example a link from a URL to another URL; a link from a Word document to an attached Excel Spreadsheet; etc.
  1.2 Update Items
  Allow content to be updated.
  Notify all persons and/or groups of persons that have been assigned to an Item when an Item has changed. This includes RSS and other real time feeds.
  Maintain version control
  Keep track of the changes
  Ensure the edited document has gone through the approval process.
  This does not pertain to Items that are updated through RSS or other real time feeds
  1.3 Index Items
  Provide a mechanism for assigning Indices to an Item.
  Allow multiple indices to be assigned to an Rein.
  Drop downs for Item, Index Category and Index
  1.4 Approve Items
  Provide a mechanism for reviewing and approving a Content Item.
  The approval process should allow for multiple approvers and the sequence of when each is to approve.
  Notify each approver when is their turn to review and approve.
  Maintain the date when each approver has approved the Item.
  Automatically add/update the Item when all approvals have been given.
  Notify the Author when a User has rejected an Item or an update to an Item
  1.5 Specify Item Relationships
  Provide a mechanism for specifying the relationship between Items. This includes Items that are embedded within or referred to in another Item.
  Do not permit redundant relationships, i.e., Item A is related to Item B and Item B is related to Item A.
  Do not permits "circular" relationships, i.e., Item A is related to Item B, Item B is related to Item C and Item C is related to Item A.

2 Manage Support Data
These functions provide mechanisms to maintain the support tables for the Knowledge Manager module 244. The functions include:
  2.1 Specify Item Types
  Enter and maintain the Item Types data.
  2.2 Specify Item Locations
  Enter and maintain the Item Locations data.
  Assign the Client logged in as the "owner" of the Item Location.
  2.3 Specify Item Technologies
  Enter and maintain the Item Technologies data.
  2.4 Specify Index Categories
  Enter and maintain the Index Category data.
  2.5 Specify Indices
  Enter and maintain the Index data.
  2.6 Specify Item Approval Process
  Identify the persons and sequence a new or updated Item should be approved by. Assign approval process by any combination of Item Type, Index Category, Item Location and Item Technology.
  Allow a User to be replaced by another User.

3 Access Items
  3.1 Control Access
  Control access to the Content Items by User, Group and Category as follows:
    Have three primary privileges that can be assigned to an Item—read only, add/update, and notification when changed
    Assign Users to Groups. Allow a User to be assigned to multiple Groups.
    Assign privileges to Users or Groups by Item Category as well as by an Item
  3.2 Search For Items
  Allow User to search by any combination of Item Type, Index Category, Index, Item Location, Item Technology.
  3.3 Record Searches
  Record all searches by search criteria (indices or Item Type), user, etc.
  For each search, capture all of the Indices used to get to the Item
  3.4 Print Items
  The system should allow a User who has access to an Item to print that Item.
  3.5 Export Index
  The Index should be able to be exported for use by other systems.
  Unlimited Categories
  There should be an unlimited number of categories to index a Content Item by.
  3.6 Track Usage
  For each access of an Item:
  Record the Item accessed and the User who accessed it
  Record the time (duration) a person spends with an Item.

Figure 5:
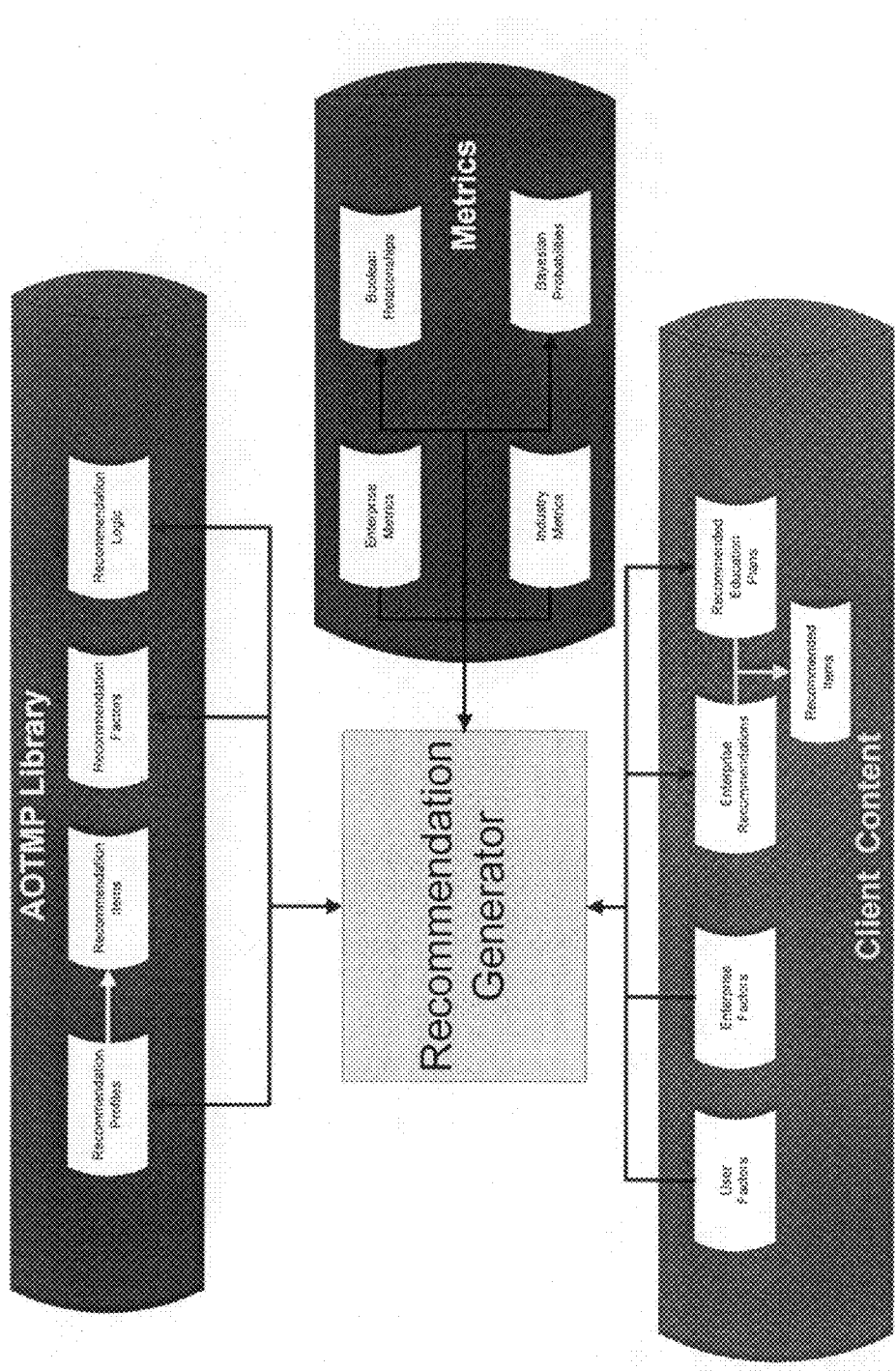
FIGS. 5 and 6 are block diagrams illustrating functions and features of a Recommendation Generator module.
Figure 6:
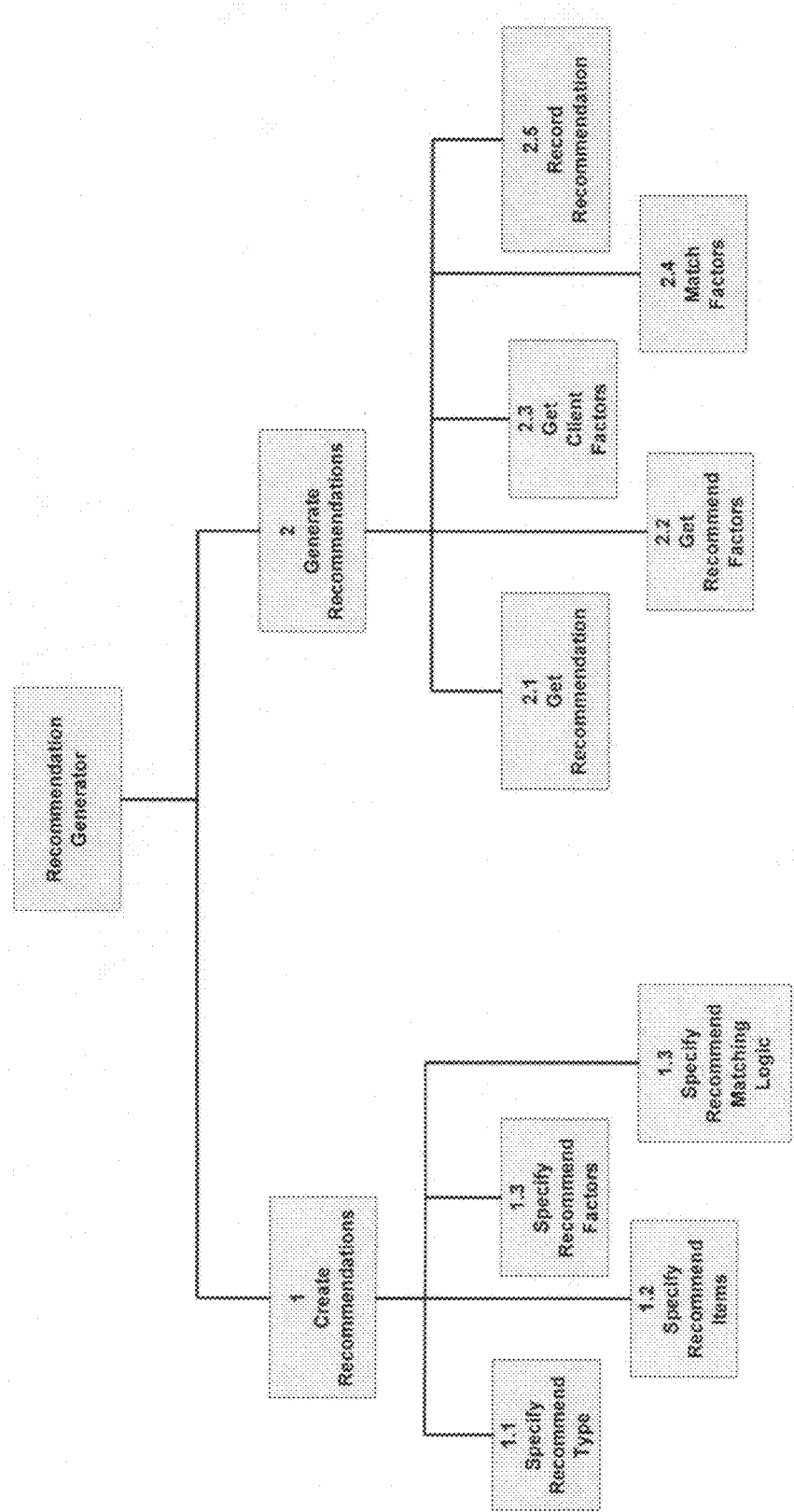

3.7 Survey Reader's Experience
  Include a survey a User fills out upon completion of a session with the Knowledge Manager.
  Build the survey from the survey Items.
  Display survey to user and record the responses.
Recommendation Generator Module A Recommendation Generator module 242 is an intelligence engine that collects and stores data from AOTMP analysts and researchers in memory 210 and uses Boolean analysis to analyze the conditions and factors that determined why each recommended improvement initiative was made and the AOTMP content required to implement each initiative. FIGS. 5 and 6 illustrate functions and features of the Recommendation Generator module 242. The Recommendation Generator module 242 also uses Bayesian analysis to generate recommended improvement initiatives and the AOTMP content that will be generated and/or used during the execution of the initiative.

Recommendations are based upon conditions that a user or enterprise meet. Recommendations contain actions to be taken, deliverables to be created, and the content items that are to be used. Personnel recommendations include education plans that include the courses to take, the certifications to be attained and the additional readings (articles, case studies, technical manuals, etc) that will help an individual increase their telecommunication technical and management skills.

There are illustratively three types of Enterprise recommendations made by the Recommendations Generator module 242—major process changes that require more than 40 hours to complete, minor major process changes that require less than 40 hours to complete, and performance anomalies that should be investigated.

The Recommendation Generator module 242 an intelligence engine that illustratively provides a three step process for generating recommendations. The first step is to store and analyze how AOTMP analysts and researchers make recommendations in order to reproduce those recommendations when the conditions that are the determinants are present. In an illustrated embodiment, step one may be implemented as follows:
  1. Identify the Factors that make up the Conditions that determine when a recommendation is made.
  2. Determine the Boolean logic between the Factors that is used to generate each recommendation.
  3. Analyze the Boolean logic to determine the fewest number of Factors and their state (True or False) that need to be validated to either generate or reject a recommendation.

In an illustrated example: A recommended education plan may include the following:
  1. Read Case Study #103
  2. Read article #1109
  3. Take Course #234
  4. Take Specialty Certification #982
The conditions that determined this education plan for a person are the following:
  Person answers "D" to Question 7 on Assessment #27 (FACTOR1)
  AND
  Person answers "A" to Question 12 on Assessment #27 (FACTOR2)
  OR
  Person performs Role 'X' (FACTOR 3)
  AND EITHER
  Person has >3 years experience (FACTOR 4)
  OR
  Person has attained 'Silver' certification (FACTOR5)

This results in Boolean expression is as follows:

$$[FACTOR1 \cap FACTOR2] \cup [FACTOR3 \cap (FACTOR4 \cup FACTOR5)]$$

The Recommendation Generator module 242 determines that the above expression is logically equivalent to:

$$A \cap (B \cup C)$$

Where A is (FACTOR1 AND FACTOR2), B is FACTOR3 and C is (FACTOR4 OR FACTOR5)

This expression is always true when "A" is true. If "A" is false and "B" or "C" is false, the expression is false.

The Recommendation Generator module 242 then analyzes this and determines the following search pattern:
  Check for FACTOR1 AND FACTOR2. If both are present, generate the Recommendation. If not, continue the search.
  Check for FACTOR3. If present, continue the search. If not, terminate the search.
  Check for FACTOR 4. If present, generate the recommendation. If not, continue the search.
  Check for FACTOR 5. If present, generate the recommendation. If not, terminate the search.

This will be all that is needed for cases where all of the conditions are met, i.e., all of the factors and their relationships meet the specification for generation of a stored recommendation. This will not always be the case. Sometimes an enterprise or person's conditions will not precisely meet the conditions required for any of the previous recommendations. Because telecom services, technologies and management issues change rapidly, the Recommendation Generator module 242 is able to analyze factors that do not satisfy the specific conditions of any previously made recommendation and still make intelligent recommendations.

The Recommendation Generator module 242 uses a Bayesian analysis between Recommendation Items and the Factors that determine when a recommendation is made. The following basic Bayesian formula may be used to calculate the probability that any specific item will be recommended when a specific factor is present.

$$P(Ix/Fy)=[P(Fy/Ix)*P(Ix)]/P(Fy)]$$

Where P (Ix/Fy) is the probability of Item X being recommended when Factor Y is present; P (Fy/Ix) is the probability of Factor Y being used when Item X was recommended; P(Ix) is the probability that Item X is recommended and P(Fy) the probability that Factor Y is present. Variations of this calculation may be used to calculate the probability of combinations of Recommendation Items and Factors. As more and more data is compiled, the analysis will expand to include additional factors such as industry, management philosophy (centralized vs. distributed), or the like.

The following equation may be used to calculate the probability of recommending an Item when two factors are present:

$$P(Ix/(F \cap Fz)=[P(Fy \cap Fz)*P(Ix)]/P(Fy \cap Fz)$$

Figure 7:
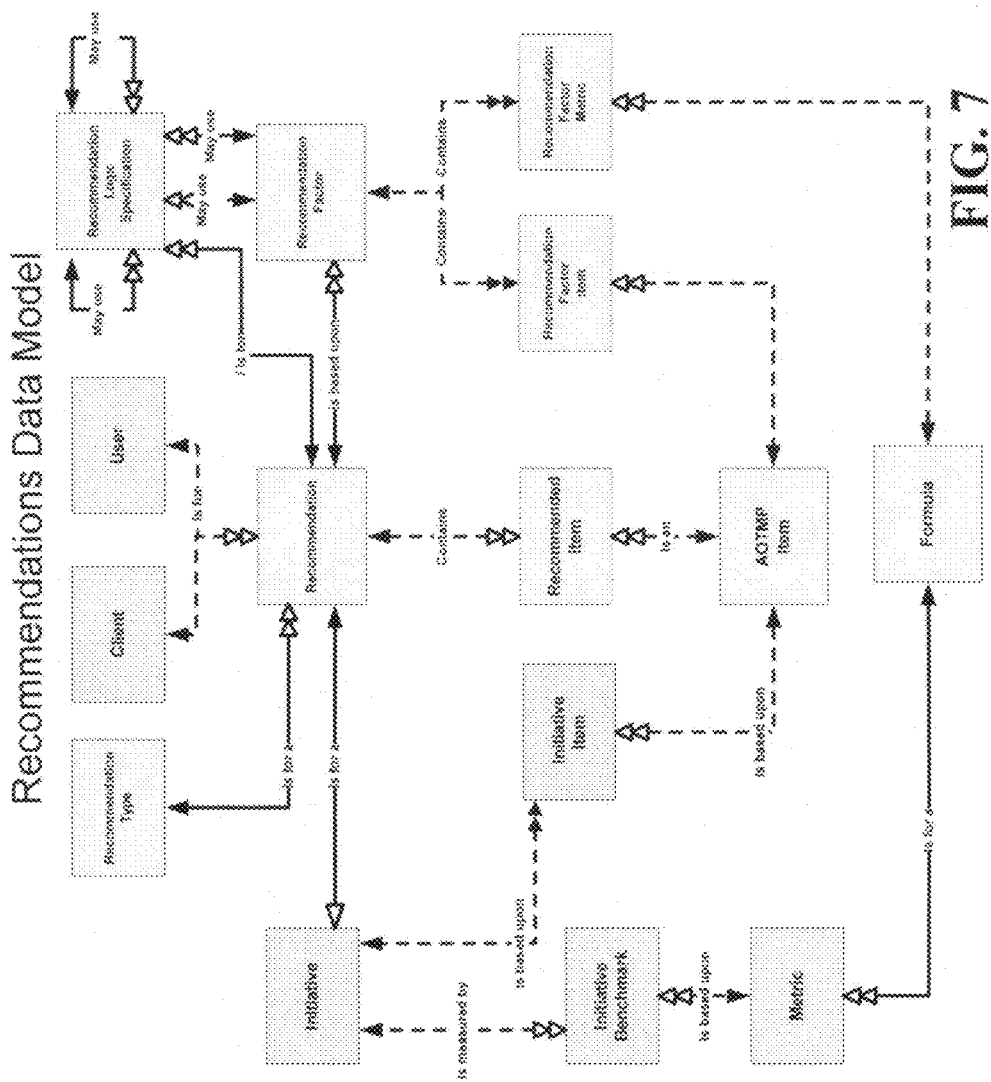
FIG. 7 is a block diagram illustrating a recommendation data model implemented by the Recommendation Generator module.

Recommendations generated by the Recommendations Generator module 242 illustratively are displayed along with the probability computed that it should be included as part of the overall recommendation. When evaluated by a user and accepted, the generated recommendation and its factors will be stored in the Recommendation database tables. FIG. 7 illustrates a recommendations data model implemented by Recommendations Generator module 242.

Further details of the Recommendation Generator module 242 are provided below with reference to FIG. 6. The Recommendation Generator module 242 stores each recommendation made by AOTMP Analysts and Researchers, the factors used to make each recommendation, and the logic used with the factors that results in a recommendation in memory 210. This data is stored in the AOTMP Library database 230. Recommendation Generator module 242 then uses this data to analyze User and Client to create recommendations for individuals (education plans) and for the Client (major changes that take 40 or more hours, minor changes that can be implemented in less than 40 hours and anomalies in client performance metrics that warrant investigation. Numbers below correspond to blocks in FIG. 6.

1 Create Recommendations

This section details the functions of recording the logic of recommendations made by AOTMP Analysts and Researchers.

1.1 Specify Recommendation Type

There are four types of recommendations that can be made—personal education plans, major enterprise initiatives (more than 40 hours), minor initiatives (40 hours or less) and performance anomaly investigations.

1.2 Specify Recommendation Items

For each recommendation, specify the AOTMP content items that accompany the recommendation. For education plans, this includes the classes recommended, any and all readings recommended, and all other content to be included. For all major and minor initiatives it includes standards & best practices to be implemented, policies & procedures, project plan templates, etc. For anomaly investigations it includes the source of the anomaly and any additional content deemed appropriate.

1.3 Specify Recommendation Factors

For each recommendation, specify the factors that are required to generate the recommendation. Factors can be the presence or absence of a specific content item. For example, the specific answer to a skills assessment question for a User who performs a specific role could lead to a specific education plan. Factors can also be metrics. Each Factor can be comprised of multiple items.

1.4 Specify Recommendation Matching Logic

For each recommendation, specify the logic between the factors that result in the recommendation. For each Factor, specify the logical relationship for each Item and between the Items that comprise the Factor. Each Factor can have only one type of item—metric or an AOTMP Library Item. For factors comprised of AOTMP Library Items, the valid logical operands for each factor's items are '+' and '−' with '+' meaning the item exists in the Client's Content and '−' meaning it does not. The valid logical operands between the items are 'OR' and 'AND'. Only one of these can be specified for a Factor. For factors comprised of Metrics each Metric can have a coefficient.

Metric Manager Module

Figure 8:
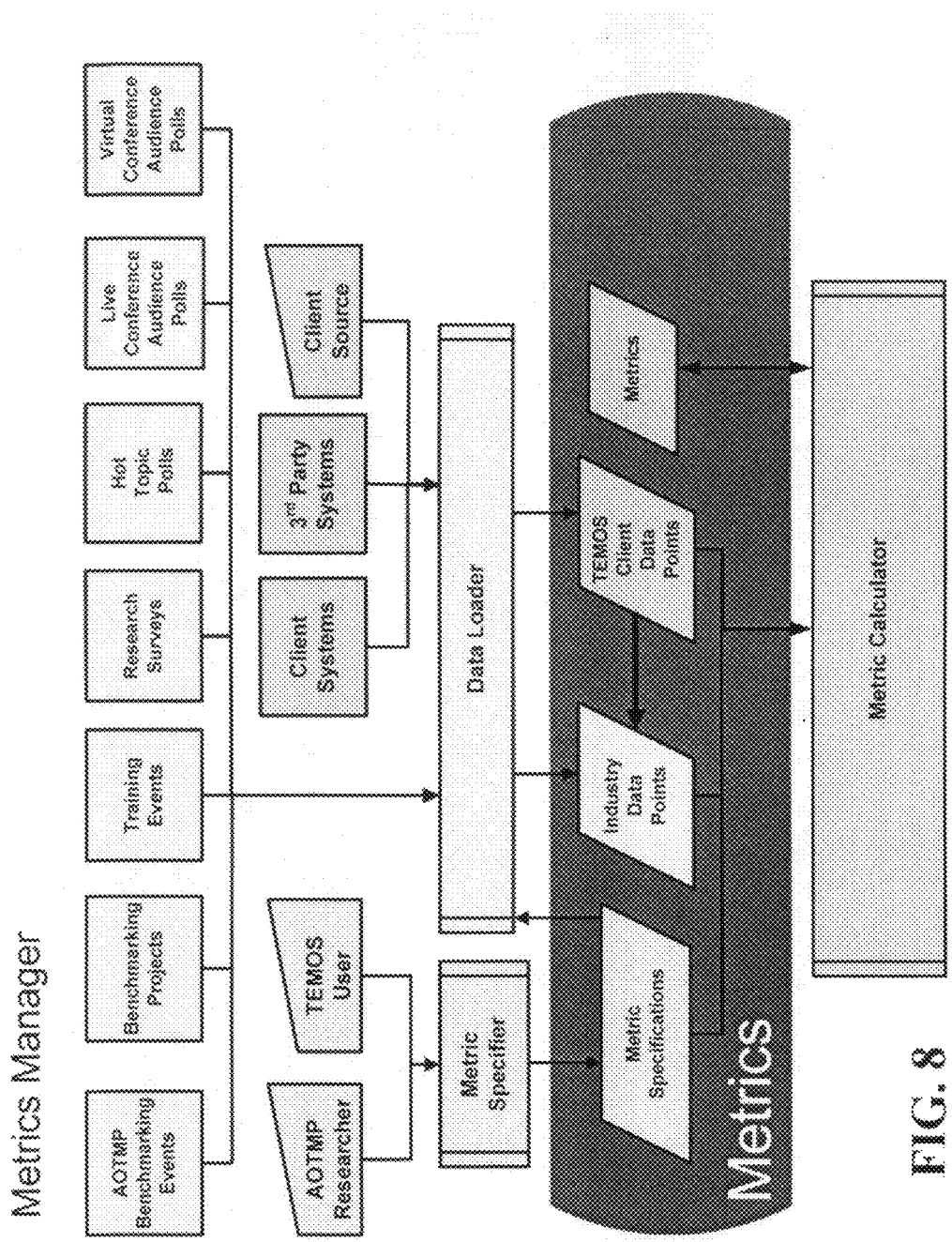
FIGS. 8 and 9 are block diagrams illustrating functions and features of a Metrics Manager module.

Metrics are used to evaluate current performance, analyze performance deficiencies, recommend improvement initiatives and validate initiative results. The TEMOS Metric Manager module 240 provides functions and includes features illustrated in FIGS. 8 and 9. Metric Manager module 240 illustratively includes three main components—a Metric Specifier, a Data Loader and a Metric Calculator as shown in FIG. 8. The Metric Specifier defines the metrics and data points used to compute the metrics. The Data Loader takes the raw data from the sources and loads it as data points into the Metrics database 232. The Metric Calculator then uses these data points to calculate the Metrics.

Metric Specifier

The Metric Specifier manages the meta-data of the Metrics. The meta-data includes the definition of each metric, the formula or algorithm used to calculate each Metric, the variables (fields) used in the algorithms and the use of other Metrics in the calculation of this Metrics. For example, one illustrative Metric may be defined as:

Average Number of Days for Service Order (SO) Completion.

The algorithm to calculate this metric is defined as:

Total Days for Completing all SOs/Total Number of SOs

Total Days for Completing all SOs is a metric defined as:

$\Sigma$(SO Submit Date−SO Completion Date) for all service orders.

Total number of SOs, SO Submit Date and SO Completion Date are variables.

Client meta-data includes assigning names to the AOTMP defined Variables and Metrics so that they are consistent with the client's use of the variable/metric. These names will also be used by the Data Loader to translate fields from Client Sources to AOTMP Defined Data Points.

The Metric Specifier allows each client to define names for each metric and each variable. It will capture source(s) of the data points for each variable. This is used by the Data Loader as described below. It also allows the system to report each metric in terms the client currently uses. Each Client also has the capability to define their own metrics they can use for their own internal analysis.

Finally, each client may define the Dimensions they want to use to analyze their performance. Examples are locations, types of services utilized, service providers, etc. Dimensions are assigned by how the data is collected and, therefore, are dependent upon the Source. Every Data Point can have multiple dimensions allowing it to be used multiple times. A metric may be calculated for each dimension as well as for each combination of dimensions. For example, a metric defined as Average Cost per Employee can be calculated for each service type, each location, each vendor, each service type at each location, and each service type for each vendor, etc.

This enables TEMOS 100 to perform analyses across the enterprise to identify anomalies in performance. For example, calculation of the Metric Average Cost per Retail Square Foot for a retailer may be $0.45. The calculation of this metric for each location may result in metrics that range from $0.31 to $0.85 per retail sq ft. Metrics that have statistically significant variations can be used to identify areas to investigate to determine why they are higher or lower than the enterprise's average.

Formula Wizard

The Metric Specifier includes a Formula Wizard. This tool leads the user through the generation of the algorithms that calculate the metrics. It ensures that the users use only valid variables, ensures consistency in the use of the units of measurement for each variable, allows only valid mathematical operations be specified, ensures groupings are valid, identifies how to use metrics generated for a previous period for generating the metric for this period, and specifies 'Boolean' metrics so that the calculator will compute a "True" or False" answer. The Formula Wizard specifies extremely complex algorithms and even more so for modifying these algorithms. For example, the Environment Performance Index (EPI) discussed above is an algorithm that may contain over 1000 variables with at least seven complex sub-metrics each of which will be used to measure one of the core management disciplines of telecom.

Data Loader

The Data Loader converts data collected from the various sources as shown in FIG. 8 into the Data Points used to calculate the metrics. It uses the specifications for each source defined by the Metric Specifier and uses them to decompose the fields into the Data Points. For example, an invoice will be decomposed into the individual fields/data points such as amount due, invoice date, invoice payment date, late fees due, date of last payment, etc. The source of each Data Point utilized is captured so that the database can maintain an audit trail for how every Metric is calculated. This is also true for the Industry Data Points. The Metric Specifier defines the variables in the survey, poll, etc. and the Data Loader decomposes each source into the data points. The Data Loader will also load TEMOS client metrics into tables in the Industry Metrics database 232.

The source of the data for Industry and Client databases is illustrated in FIG. 8. Client data points come from Client Systems such as their ERP, AP, TEM, etc. or from a third party they employ to help manage their telecom and from Client Sources. Client Sources include personal systems (such as Excel spreadsheets, etc) and from research they have done.

Metric Calculator

The final piece of the Metrics Manager module 240 is the Metric Calculator. This program calculates the metrics from the algorithms specified. It will determine the types of calculations to be made and call an appropriate calculation module to perform each calculation. This includes simple algebraic calculators as well as complex statistical calculations including the Bayesian formulae used by the Recommendation Generator module 242 discussed above.

The calculation engine not only generates the metrics from the data points, but also records for each data point used in the calculation the source of and the date each data point was generated, and provides all of this information upon request.

The Metric Calculator will also calculate a Boolean "result" for factors that comprise a condition for a Recommendation. For example, an Investigative Recommendation into Total Spend could have the condition that if Total Spend this month is more than x % (determined by each client) than last month.

Further details of the Metrics Manager module 240 are provided below with reference to FIG. 9. The Metric Manager manages algorithms used to evaluate performance and to validate the outcomes of initiatives. It includes the definitions of all of the variables, formulae and dimensions by which the data will be analyzed. The Metric Manager module 240 defines, calculates, and reports the metrics used by TEMOS. This includes industry metrics as well as each Client's metrics. There are four basic functions of the Metrics Manager module 240. Numbers below correspond to blocks in FIG. 9.

1 Specify Metrics
2 Collect Data Points
3 Calculate Metrics
4 Report Metrics.

1 Specify Metrics

This function is to specify all of the data required to calculate the Metrics used by TEMOS. Each Metric is calculated from a formula or algorithm using Data points collected from clients for the values of the Variables specified in each Formula. Metrics are generated from Data Points collected from both TEMOS Clients as well as from non-TEMOS clients. Non-TEMOS clients data comes from surveys, telephone conversations, etc and are used to calculate industry metrics that are used for benchmarking performance. It includes the following functions:

1.1 Define Variables
Each Variable used in the calculation of a Formula is defined including: Name, type (number, $, %, time, etc.).

1.2 Define Sources
Define the Sources that provide the Data Points that generate the Metrics. Also, manage the Source Categories.

1.3 Define Dimension Categories
The Client Metrics database 234 is designed as an array of unlimited dimensions to allow each Client to collect and analyze their data any way they want to. A Dimension is used to identify what the Client's Data Points for a Variable are. For example, the Data Points for the Variable 'Total $ Spent' could be by Vendor, service type, location, component type, etc. Each of these is a Dimension Definition that Formulae can then calculate to create a 'Total $ Spent' Metric by Location, Vendor, Service Type and Component Type as well as any combination of Dimension Definitions.
The Dimensions are defined by how the Data Points will be loaded into TEMOS.

1.4 Define Formulae
Define the Formulae that generate the Metrics. Utilize the Formula Wizard to define and edit Formulae.

1.5 Determine Calculation Sequence
A formula can have other formulae embedded within them. The Calculator must know the calculation sequence of the formulae so that all metrics are calculated and available to use in the calculation of the metric from the formula being defined. The formula defined must have a Calculation Sequence 1 greater than highest Calculation Sequence of any of the Formulae specified as a Variable. If no other formulae are used within the formula being defined, set the Calculation Sequence to 1.

1.6 Formula Wizard
The Formula Wizard will guide a user through the definition of each character of a Formula. The Wizard will utilize four types of fields for each formula—groupings, mathematical operators, variables and formulae.
Groupings are left parentheses '(' and right parentheses ')'
Use drop downs of the valid field types for each character of the formula for the user to select
Use Drop down box to select Variables and Formulae used as Variables
Use Drop down box to select Operators
There must always be as many right parentheses as left parentheses 1.7 Define Dimensions
Enter the Dimensions that are valid for each Dimension Category for each Client. For example, a Dimension Definition could be by Vendor and the Dimensions tracked could be AT&T, Verizon, AOL, etc.

1.8 Define Client Variables
Create a map of the names of the Data Points provided by the Client to the names of the Variables used by TEMOS. This includes:
Identifying the Source of the Data Points for the Client's variable
The name the client uses for the Data Point and the Variable TEMOS uses
Allow multiple Client Variables to translate to the same TEMOS Variable.
Assign date Data Points for each Client Variable Source will be downloaded 2 Collect Data Points
The Data Points provided by the Client are collected for use by TEMOS. They can come from many different sources and have different names. There are three primary requirements to do this: Map Variables, Load the Data Points and Report Errors in the loading.

Metrics established are calculated from the Formulae using live Data Points collected for the Variables.

2.1 Map Variables

Data Points from the Client's systems are mapped to the Variables through the Client Variables table. to translate the names, dimensions, etc. For each Data Point loaded also load the following data:

Client Source it comes from

The name of the Client Variable

The Variable it is related to 2.2 Load Data Points

Data Points from the Client's system are loaded using the Variable Map to translate the names, etc. For each Data Point loaded also load the following data:

Date loaded; date of the Client Variable, etc.

Source

Data Point Dimension(s) (if present)

2.3 Generate Error Report

While the data is being loaded log and report all of the following conditions:

If a Dimension is not in the Dimension Table, flag the Data Pont and the invalid Dimension Flag and identify any Client Variable Name is not in the Client Variable table.

3 Calculate Metrics

The Metrics established are calculated from the Formulae using live Data Points collected for the Variables. It includes the following functions:

3.1 Calculate

The Metric Calculator will run periodically and calculate Metrics based upon the following criteria:

For all Data Points available

For each Dimension

In Calculation Sequence (all Sequence 1's first, then Sequence 2's, etc.)

Allow manual Invocations of the Metric Calculator by

Client

Source 3.2 Maintain History

Track data used to calculate a Metric. This includes the following:

Formula used

Sub-Formulae (Metrics) used by the Formula

Each Client Variable. Data for each Variable includes:

Data Point(s) used

Source of each Data Point used

Date each Data Point was Collected

4 Report Metrics 4.1 Compare Metrics

Run reports that compare current Metrics against any of the following:

Industry Benchmarks

Market Excellence Benchmarks

Previous period Metrics 4.2 Display Calculations

Actual values of the data points, their date of collection, etc. are displayed for any and all Metrics including the formula used for the calculation.

Drop Down Formulae (include "ALL")

Select Formulae to display

Drop Down Dimensions (include "ALL")

Select Dimension(s)

Drop Down Dates

Select Date(s)

Display Formulae

For each Date and Dimension selected:

Display Date, Dimension and Metric including date calculated

Display all Data Points used to calculate the above Metric including Source, Date collected, etc.

4.3 My Dashboard

Allow Users to specify groups of metrics that can be displayed in graphs in a dashboard. Allow the Users to have multiple dashboards.

4.4 Distribute Calculations

Distribute the calculations to the assigned persons via e-mail. This can be an e-mail that tells the user when their metrics are ready for display.

4.5 Chart Results

Metrics and Metric Comparisons should be able to be charted with a bar chart, pie chart, line chart, etc, as requested by a User.

TEMOS Environment Performance Index

Figure 10:
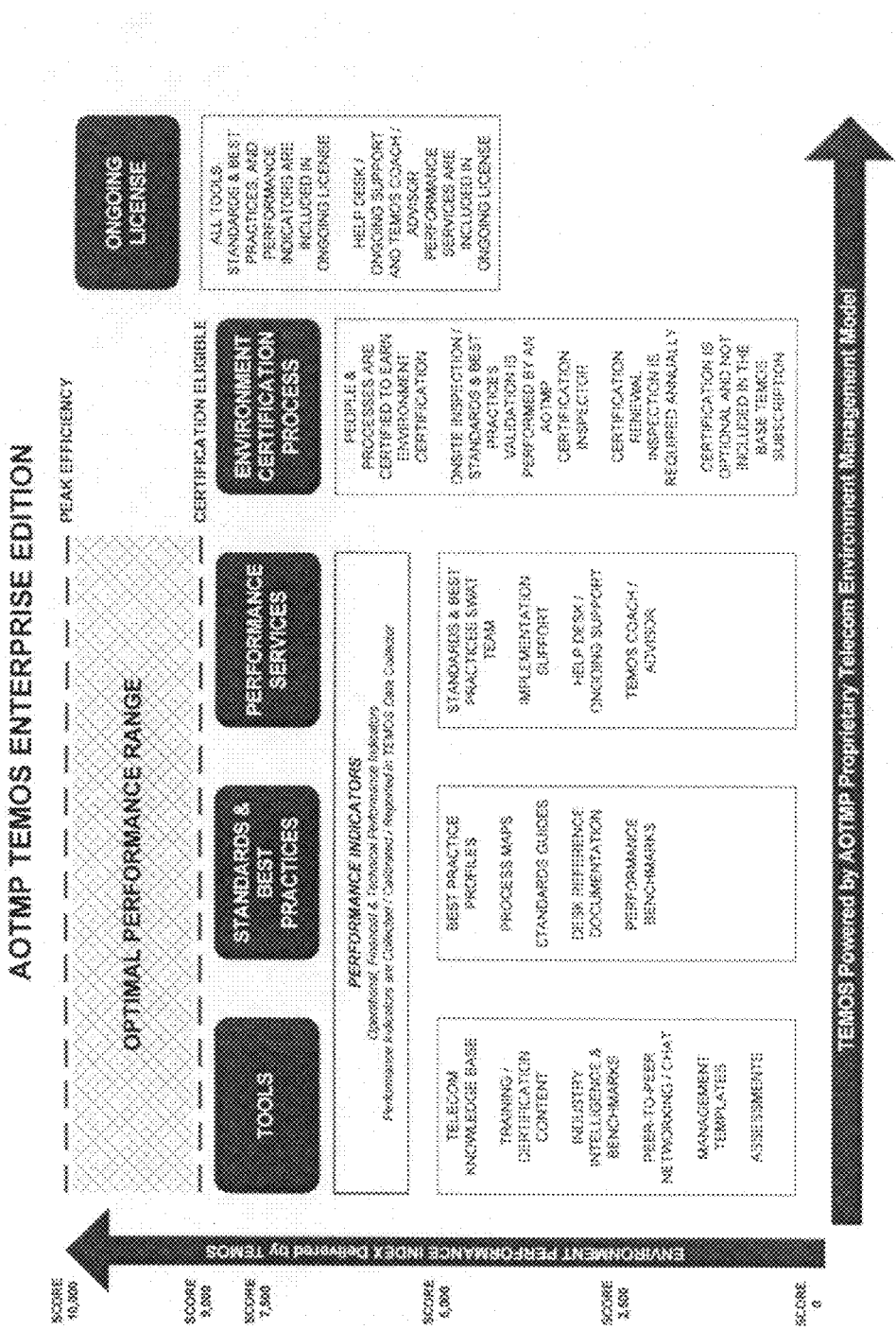
FIG. 10 illustrates features of TEMOS and Environment Performance Index calculated by TEMOS.

FIG. 10 illustrates certain features and components of the TEMOS 100 and method. In particular, FIG. 10 illustrates factors for calculating an Environment Performance Index which determines a probability of optimal performance in a telecommunication environment for an organization based on an aggregate score as discussed in detail below.

Figure 11:
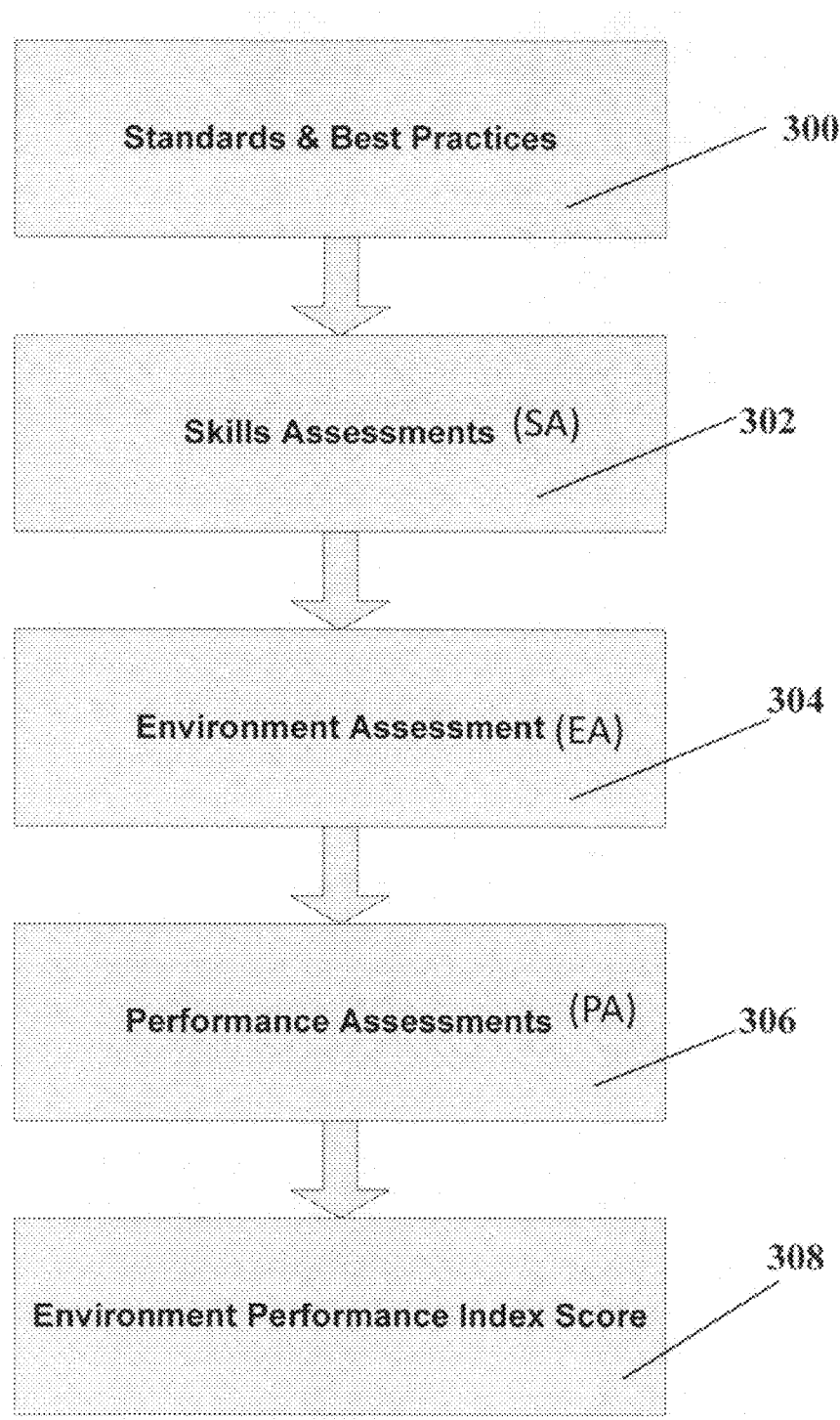
FIG. 11 is a block diagram illustrating certain components of TEMOS and their relationships in calculating the Environment Performance Index.

FIG. 11 illustrates certain components of TEMOS 100 and their relationships in scoring an Environment Performance Index for an entity working towards becoming certification eligible. As illustrated in FIG. 11, standards and best practices are defined within a framework that drives people and processes towards achieving optimal performance results as illustrated at block 300. As discussed herein, processes conform to the standards and best practices framework across seven discipline areas of AOTMP's Telecom Environment Management Model (TEMM). In an illustrated embodiment, the seven discipline areas of the TEMM include resource management, process management, technical management, asset management, project management, relationship management, and financial management.

As illustrated at block 302, skills assessments (SA) are predictive indicators that measure the probability that people have the skills and knowledge required to achieve optimal performance results. In an exemplary embodiment, a minimum of three skills assessments in each of the seven areas of AOTMP's TEMM are used to measure predictive performance (illustratively 0-50 points each) for each evaluation cycle.

Figure 13:
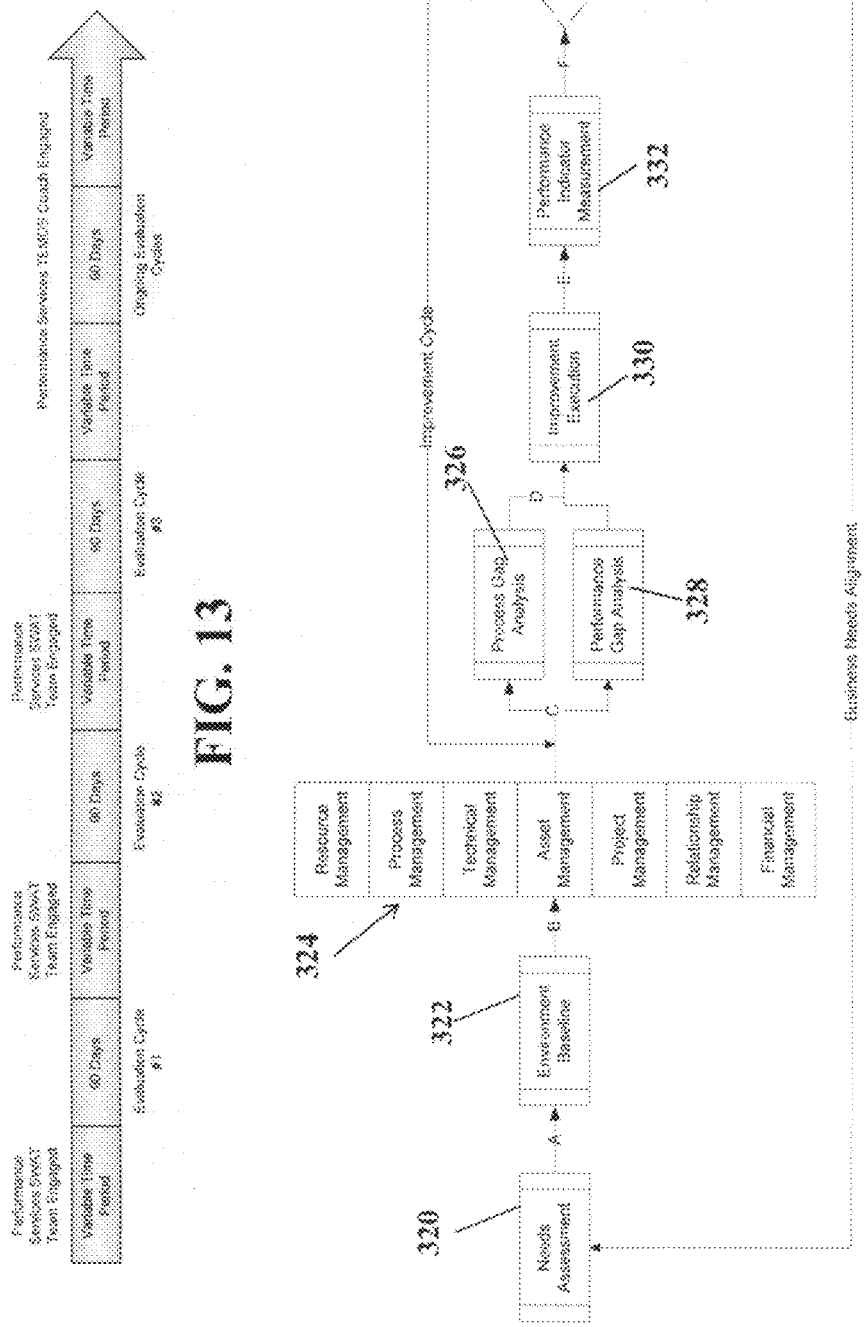
FIG. 13 illustrates a timeline and intervals for TEMOS implementation.

FIG. 13 illustrates an illustrative engagement timeline and intervals for TEMOS implementation. A TEMOS SWAT team engages with customer upon subscription. They provide subject matter expertise to assist customer adopt and implement TEMOS. The TEMOS SWAT team helps customer execute all phases of AOTMP's Standards & Best Practices Framework across AOTMP's Telecom Environment Management Model (TEMM). The role of the SWAT team is to assist customer with initial environment evaluations, performance gap analysis and implementation of AOTMP Standards & Best Practices. The SWAT team illustratively engages the customer throughout the first three evaluation cycles.

Evaluation Cycles #1 through #3

Environment performance is measured in accordance with Environment Performance Index (EPI) algorithm discussed above. Each evaluation cycle is illustratively a contiguous 90 day period, although other time periods may be used.

Certification Qualification

An average EPI score of 9000 or better is required across three consecutive evaluation cycles. A TEMOS Coach may be engaged after any evaluation cycle to help customers maintain their implementation of AOTMP Standards and Best Practices using TEMOS. If a Certification Qualification EPI score of 9000 or better is not obtained, additional evaluation cycles are measured. An average EPI score of 9000 or better across three contiguous evaluation cycles is necessary in order to qualify for Certification.

Certification

Certification illustratively requires a Certification Qualification EPI score of 9000 or better and examination (audit) performed by an AOTMP Certification Examiner. Certification Examiners audit and validates scoring integrity.

After Certification is achieved, one Re-Certification Evaluation Cycle per 12-month period is measured and validated by a Certification Examiner. A score of 9000 or better for the single Re-Certification Evaluation Cycle maintains Certification. Should the Re-Certification Evaluation Cycle yield an EPI score less than 9000, a second Re-Certification Evaluation Cycle is required and must begin within 6 months of the initial Re-Certification Evaluation Cycle. An EPI score of 9000 or better is required for the second Re-Certification Evaluation Cycle. Success in achieving the minimum threshold EPI score of 9000 along with validation by a Certification Examiner qualifies the customer for Re-Certification. Failure to Re-Certify on the second attempt initiates a period in which the average EPI across three consecutive evaluation cycles along with validation by a Certification Examiner is required to regain Certification. Re-Certification in subsequent 12-month periods follows the same methodology.

Environment assessment (EA) is also a predictive indicator used to measure the probability that processes supporting people are present to achieve optimal performance results as illustrated at block 304. Illustratively, an environment assessment is used to measure predictive performance (for example, 0-525 points each) in each evaluation cycle.

Performance assessments (PA) measure performance across the seven areas of AOTMP's TEMM as illustrated at block 306. In an illustrated example, a minimum of eleven performance assessments in each of the seven areas of AOTMP's TEMM are used (0-100 points each) for each evaluation cycle.

Finally, an Environment Performance Index (EPI) score is calculated to measure an entire environment performance as illustrated at block 308. Illustratively, a minimum of three evaluation cycles are used to qualify for certification as discussed below.

The following represents an illustrative Environment Performance Index Score Algorithm:

---
Environment Performance Index Score Algorithm - First Evaluation Cycle Measurement (max score = 10000)
---
Environment Performance Index Score (EPI Cycle #1) =
((SUM All SA Scores)/(Qty of SAs)) * (21) +
(EA Score) * (2) +
((SUM All PA Scores)/(Qty of Individual Measurements)) * (77) +
(200)

---
Environment Performance Index Score Algorithm - Second & Third Evaluation Cycle Measurements (max score = 10000)
---
Environment Performance Index Score (EPI Cycle #2) & (EPI Cycle #3) =
((SUM All SA Scores)/(Qty of SAs)) * (21) +
(EA Score) * (2) +
((SUM All PA Scores)/(Qty of Individual Measurements)) * (77) +
(200)

---
Environment Performance Index Score Alaorithrn - Certification Qualification Measurement (max score = 10000)
---
Certification Qualification Environment Performance Index Score = (AVERAGE EPI #1 + EPI #2 + EPI #3)

---

Figure 12:
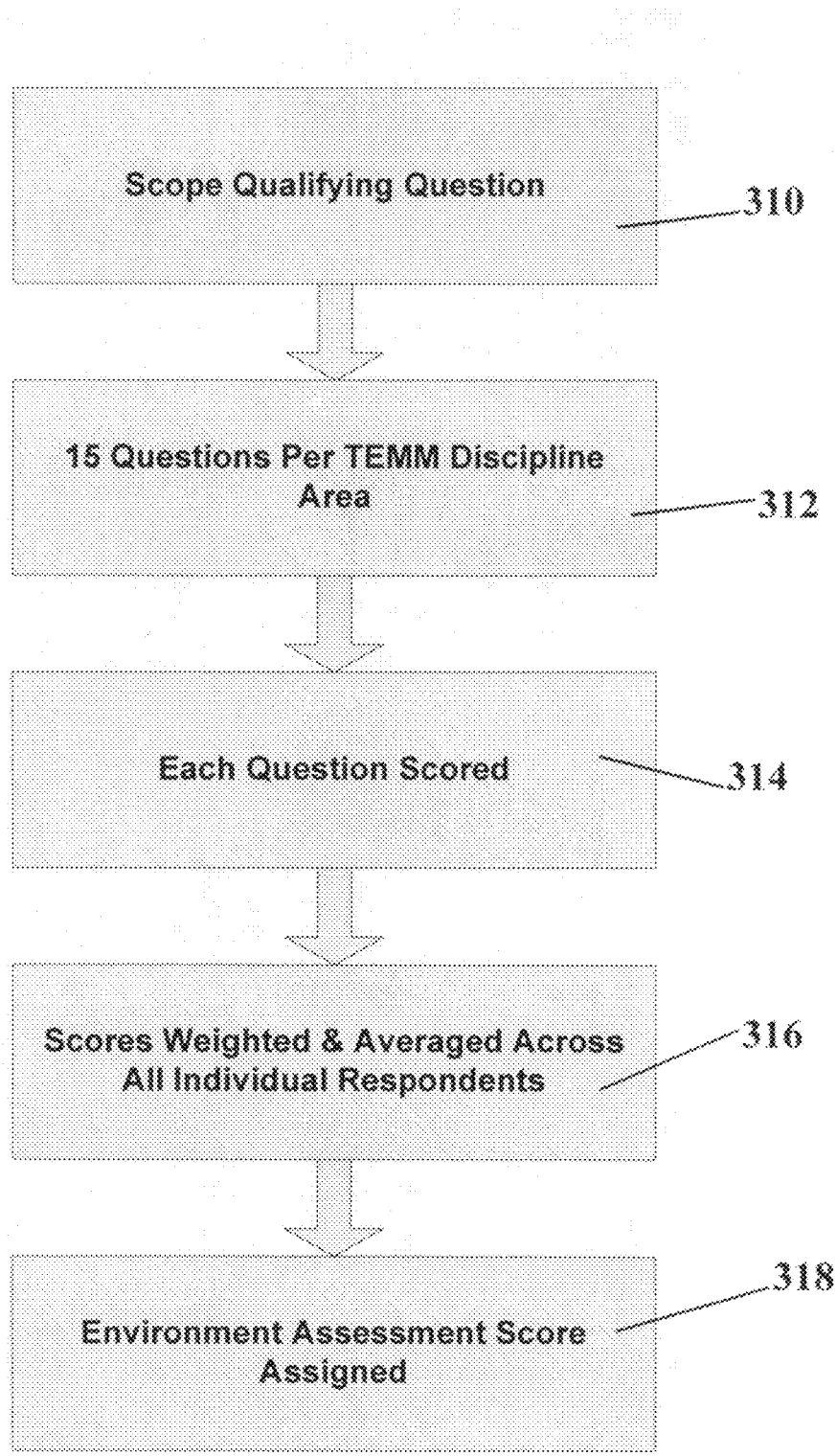
FIG. 12 illustrates an embodiment of an Environment Assessment score algorithm used in calculation of the Environment Performance Index.

FIG. 12 illustrates an exemplary Environment Assessment Score algorithm used at block 304 of FIG. 11. A scope qualifying question is used to determine a respondent's process relationship to a TEMM discipline area as illustrated at block 310. "Results responsibility" indicates a management oversight, owning the outcome as it relates to business objectives that the respondent has. "Direct responsibility" is a functional role for process execution. An "indirect responsibility" is a functional role for a related process as defined by TEMM standards and best practices. "No responsibility" indicates that the respondent has no direct or indirect interface with processes.

Next, questions for each TEMM discipline area are asked as illustrated at block 312. Illustratively, fifteen questions are asked for each of the seven disciplines, with each question being worth up to five points. Therefore, a total of 105 questions are asked across the seven discipline areas. Next, each question is scored as illustrated at block 314. Scoring is based on a scoring legend containing point values. Illustratively, points are awarded based on the degree to which answers adhere to AOTMP standards and best practices.

Scores are then weighted and averaged across all individual respondents as illustrated at block 316. The scores for each individual completing an assessment are illustratively weighted using a scope qualifying question for the individual and averaged to provide a predictive assessment of environment compliance with AOTMP standards and best practices. In an illustrated embodiment, questions answered by individuals with "results responsibility" as classified at step 310 above, are weighted by a factor of four. Questions answered by individuals who have a "direct responsibility" are weighted by a factor of three. Questions answered by individuals with "indirect responsibility" are weighed by a factor of two. Questions answered by individuals with "no responsibility" are weighted by a factor of one.

Finally, an Environment Assessment (EA) score assigned as illustrated at block 318. The Environment Assessment score predicts entire environment performance. In the illustrated embodiment, the assessment scoring the Environment Assessment scoring scale is from 0-525 points. Additional details of the environment assessment score are as follows:

Environment Assessment Score Algorithm ((SUM Scores for All Question Coded with Results Responsibility Qualifier)/(Qty of Questions))/ (Qty of Results Responsibility Respondents)*4+ ((SUM Scores for All Question Coded with Direct Responsibility Qualifier)/(Qty of Questions))/(Qty of Direct Responsibility Respondents))*3+((SUM Scores for All Question Coded with Indirect Responsibility Qualifier)/(Qty of Indirect Responsibility Respondents))*2+((SUM Scores for All Question Coded with No Responsibility Qualifier)/(Qty of Questions))/(Qty of No Responsibility Respondents)*1=Aggregate Score (Aggregate Score)/10=Environment Assessment Score The following description provides additional details for the skills assessments at block 302 of FIG. 11, environment assessments at block 304, standards and best practices profiles, and certifications of an illustrative embodiment of the present invention. EXHIBITS #1-#7 attached to the present application are expressly incorporated by reference herein.

1. Skills Assessments - See EXHIBIT #1
   a. Skills Assessments are used as predictive indicators of optimal performance.
   b. Method for structuring questions - content tied to TEMM process methodology - See EXHIBIT #2
      Specific mix of 50 questions geared towards skills area subject matter and practical process knowledge enabling a score that reasonably predicts ability to apply knowledge in a manner consistent with Standards & Best Practices. The higher the score, the more accurate the comprehension of skills required to execute Standards & Best Practices processes.
   c. Scoring Assessment Scale
      48 to 50: Demonstrates a very high level of accuracy and understanding of assessment skills area specifics
      40 to 47: Demonstrates a high level of accuracy and understanding of assessment skills area specifics; supplemental education is recommended for assessment skills area mastery
      30 to 39: Demonstrates a moderate level of accuracy and understanding of assessment skills area specifics; supplemental education is recommended
      20 to 29: Demonstrates a minimal understanding of assessment skills area specifics; supplemental education is highly recommended
      10 to 19: Demonstrates a lack of understanding of assessment skills area specifics; supplemental education is required
      0 to 9: Supplemental education is required to gain understanding of assessment skills area
   d. Certifications for individuals have been developed to educate users on Standards & Best Practices. Participation in certifications and courseware provide the education/training, background and knowledge users require to improve Skills Assessment Scores.
      Illustrative General studies certifications include:
         1. Certified Telecom Management Administrator (CTMA) - See EXHIBIT #3
            a. 24 hours of course study including hands on exercises.
            b. The exam contains 100 questions; each question is worth 1 point.
            c. The exam must be completed in within two hours.
            d. A passing score of 80% (80 points) or better is required to obtain certification credentials
         2. Certified Telecom Management Specialist (CTMS) - See EXHIBIT #4
            a. 40 hours of course study including hands on exercises
            b. The exam contains 150 questions; each question is worth 1 point. - See EXHIBIT #5
            c. The exam must be completed within three hours.
            d. A passing score of 80% (120 points) or better is required to obtain certification credentials
         3. Certified Telecom Management Executive (CTME) - See EXHIBIT #6
            a. 24 hours of course study including hands on exercises
            b. The exam contains 100 questions; each question is worth 1 point.
            c. The exam must be completed in within two hours.
            d. A passing score of 80% (80 points) or better is required to obtain certification credentials
      Illustrative Specialist studies certifications include:
         1. Technology Selection Specialty Certification
         2. Management Strategies Specialty Certification
         3. Contract Negotiations Specialty Certification
         4. Budget Management Specialty Certification
         5. RFP Management Specialty Certification
         6. Vendor Management Specialty Certification
         7. MACD Management Specialty Certification
         8. Disaster Recovery Planning Specialty Certification
         9. Wireless Management Specialty Certification
         10. Inventory Development Specialty Certification
         11. Local Service Analysis Specialty Certification
         12. Long Distance Service Analysis Specialty Certification
         13. Data Service Analysis Specialty Certification
         14. Wireless Service Analysis Specialty Certification
         15. Invoice Processing Specialty Certification
         16. Dispute Resolution Specialty Certification
         17. Taxes, Surcharges & Fees Specialty Certification
         18. Tariff & CSR Interpretation Specialty Certification
         19. Specialty Certification examination
            a. Each Specialty Certification includes 6 hours of course study including hands on exercises.
            b. Each Specialty Certification exam contains 30 questions; each question is worth 1 point.
            c. A passing score of 80% (24 points) or better is required to obtain certification credentials
      Illustrative Advanced specialty certifications include:
         1. Financial Management Specialty Certification
         2. Resource Management Specialty Certification
         3. Process Management Specialty Certification
         4. Technical Management Specialty Certification -continued 5. Asset Management Specialty Certification
      6. Project Management Specialty Certification
      7. Relationship Management Specialty Certification
      8. Advanced Specialty Certification examination
          a. Each Specialty Certification includes 12 hours of course study including hands on exercises.
          b. Each Specialty Certification exam contains 30 questions; each question is worth 1 point.
          c. A passing score of 80% (24 points) or better is required to obtain certification credentials
  e. Non-certification knowledge content conforming to AOTMP Standards & Best Practices is also available to augment and enforce education. This content includes a variety of courseware titles.
    eLearning Courseware titles include:
      1. Alerts & Scams - 1 hour
      2. Auditing Packet Switched Circuits & Services - 1 hour
      3. Auditing Telecommunications Invoices - 2 hours
      4. Building a VoIP Business Case - 2 hours
      5. Cost Containment & Cost Avoidance Practices - 1 hour
      6. Correcting Invoice Errors & Obtaining Credits for Overcharges -1 hour
      7. Contract Management Tips - 1 hour
      8. Customer Service Record (CSR) Interpretation Practices - 1 hour
      9. Building a Disaster Recovery & Business Continuity Plan - 2 hours
      10. E-911 Checklist: Is Your Organization Compliant? - 1 hour
      11. Emerging Technologies: Fixed-Mobile Convergence - 1 hour
      12. How VoIP Works - 2 hours
      13. Inventory & Change Control Practices - 2 hours
      14. TEM Insourcing & Outsourcing Decisions - 1 hour
      15. Move, Add, Change & Disconnect Best Practices - 2 hours
      16. Contract Negotiations - 2 hours
      17. Project Plan: Implementing a New Service Contract - 2 hours
      18. Developing & Managing an RFP - 2 hours
      19. Creating & Managing Service Level Agreements - 1 hour
      20. Creating a Service Provider Relationship Management Plan - 2 hours
      21. Using an RFP to Select a TEM Provider - 2 hours
      22. Telecom Budgeting Strategies - 1 hour
      23. Telecom Trends: Data Services - 1 hour
      24. Developing a Telecom Expense Management Plan - 1 hour
      25. Achieving Your Telecom Management Objectives: 20 Tips You Need to Know - 1 hour
      26. Telecom Invoice Validation: Illustrations in Saving Money - 1 hour
      27. Telecom Management Check-Up: The 10-Point Review - 1 hour
      28. Telecom Records Retention Considerations - 1 hour
      29. Demystifying Service Provider Tariffs & Service/Price Guides - 1 hour
      30. Telecom Terms: Mastering the Fundamentals - 2 hours
      31. Telecom Usage Policy: Defining Policies for Your Organization - 1 hour
      32. Understanding Taxes, Surcharges & Fees - 1 hour
      33. Wireless Application Innovations - 1 hour
      34. Wireless Service Audit & Optimization - 1 hour
      35. Wireless Management Strategies - 1 hour
      36. Telecom Expense Management: More than Cost Savings -1 hour
      37. Navigating Service Provider Communications Protocols - 1 hour
      38. Technology Planning & Selection Process - 2 hours
    On-site courseware titles include:
      1. Bring Your Bills Telecom Training - 24 hours
      2. Contract Negotiations & Budgeting - 16 hours
      3. Disaster Recovery Planning - 8 hours
      4. Inventory Management & Cost Control - 24 hours
      5. Move, Add & Change Management - 8 hours
      6. Managing Providers & Disputes - 16 hours
      7. Performing Data Invoice & Wireless Invoice Audits - 8 hours
      8. Performing a Long Distance Invoice Audit - 8 hours
      9. Performing a Local Invoice Audit - 8 hours
      10. RFP Development & Management - 8 hours
      11. Telecom Essentials - 16 hours
      12. Telecom Project Management - 8 hours
      13. Telecom Technology & Convergence Essentials - 24 hours
      14. Validating Taxes, Surcharges & Fees - 8 hours
2. Environment Assessment - See EXHIBIT #7
  a. Method for structuring questions - content tied to TEMM process methodology
    Scope qualification question - determines process relationship to TEMM discipline area (see relationship category examples below)

1. Results responsibility - management oversight, owns outcome as it relates to business objectives
2. Direct responsibility - functional role for process execution
3. Indirect responsibility - functional role for related process (as defined by TEMM standards and best practices)
4. No responsibility - no direct or indirect interface with processes Questions in each TEMM discipline area determine probability for optimal process performance based on Standards & Best Practices b. Method for applying evaluation score Composite scores across multiple participants aggregated and evaluated based on qualification question response c. An illustrated Scoring Assessment Scale for Environment Assessment 0-525 points overall Each of the seven TEMM discipline areas are scored on a scale of 0-75

15 questions in each of the seven TEMM discipline areas; each question is worth 0 to 5 points Individual questions contain 5 answer options and are answered in multiple choice, select all that apply format Combinations of answers are scored against a legend that equates to between 0 and 5 points per question Example of question, answer options and scoring legend associated with the TEMM Asset Management discipline:

1. Which statements best describe your current asset inventory management practices? (select only the statement(s) that apply)
   a. All equipment, devices, circuits, services, service features are cataloged in their entirety within a consolidated database.
   b. Changes in asset inventory are validated annually.
   c. Service orders are automatically linked to assets.
   d. Asset inventory data points are validated monthly.
   e. All asset inventory cost components are validated monthly against business needs.

The scoring legend assigns points based on the degree to which answers adhere to AOTMP Standards & Best Practices. The answer legend for this question is as follows:

1. If A, C, D & E are selected, 5 points are awarded
2. If A, B, C & D are selected, 4 points are awarded
3. If, A, C & E are selected, 3 points are awarded
4. If a combination of any three answers are selected (excluding the combinations worth 5, 4 or 3 points), 2 points are awarded
5. If any combination of two answers are selected, 1 point is awarded
6. If any single answer is selected, 0 points are awarded.

d. Implementation of AOTMP Standards & Best Practices learned through certifications, courses and Standards & Best Practices Profiles enable users to improve processes supporting improvement of Environment Assessment results.

3. Standards & Best Practices Profiles a. Method for structuring profiles - content tied to TEMM process methodology Each profile contains uniform components
1. Needs Assessment
2. Business Case Development
3. Sustainability Plan (including performance measurement - PI subset)

All profiles relate to one another based on TEMM discipline structure
1. Process interlinks
2. Business case interlinks
3. Sustainability interlinks b. Standards & Best Practices Performance Measurement Process performance metrics are measured in terms of process cycle time, accuracy and reliability
1. Process cycle time measures individual effort and elapsed time. Optimal performance is indicated on AOTMP's Market Excellence Scale.
2. Accuracy and reliability is measured in terms of the percentage of process cycles achieving intended technical and financial 4. Certification Qualificationoutcomes.

a. Process for collecting data tied to TEMOS system (data collector), matching TEMM discipline Standards & Best Practices b. TEMOS contains a data collector cataloging predictive performance and process performance scores. Scores for each area of measurement are evaluated against a scale ranging from 1 to 10,000. Aggregate scores of 9,000 or greater indicate that optimal performance is attained in the environment.

5. Obtaining Certification a. Method for evaluating performance to earn certification credentials b. Certification examiners are deployed to certify the validity of environment performance scores captured within TEMOS. Quality control validations are performance against measurements to ensure accurate reading of scores. A minimum of five (5) iterative measurements of each performance measurement is required to deem scoring as accurate and relevant. Multiple measurements against performance serve to create relevant measurement results and reduce performance anomalies.

While the illustrated scoring system disclosed herein is based on a 10,000 point scoring system, it is understood that other scoring point totals and ranges may be used in accordance with the present invention. In addition, letter grades or other scoring systems may be used with the TEMOS and methods described herein. The system and method is not limited to the illustrative scoring system.

Market Excellence Performance Measurement Data Collector

Figure 14:
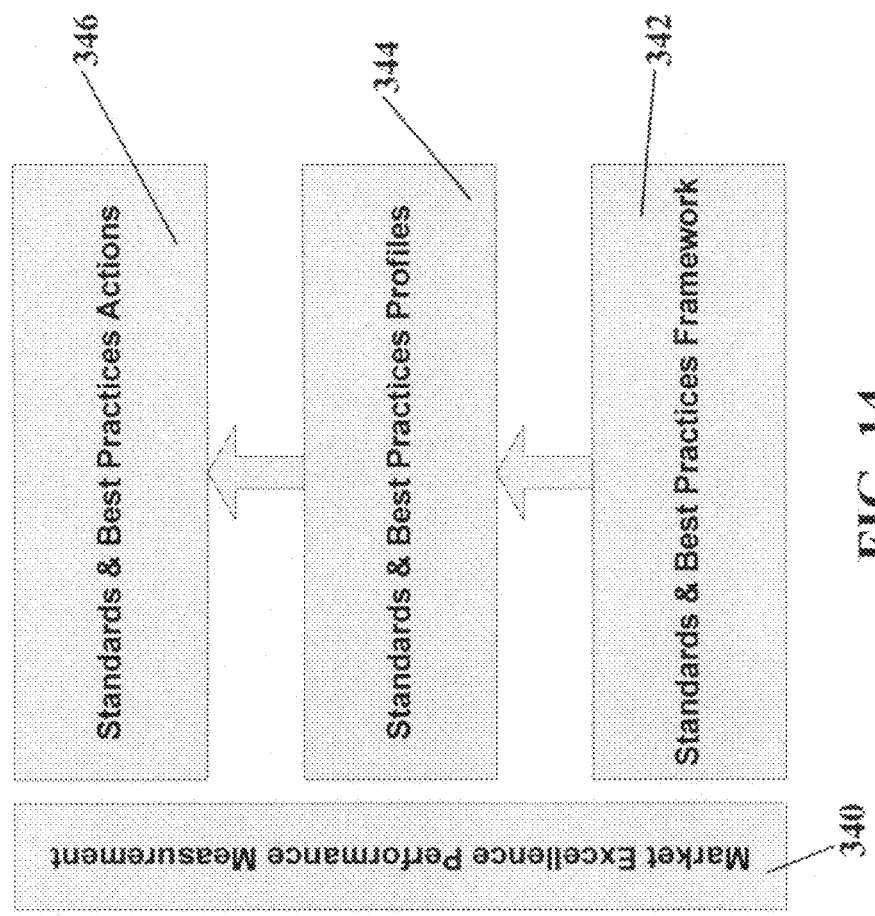
FIG. 14 is a flowchart illustrating a standards and best practices framework and a Market Excellence Performance Measurement.

FIG. 14 illustrates the Standards and Best Practices Framework as the foundation for Standards and Best Practices Profiles and Actions. Market Excellence Performance Measurement applies to all aspects of the implementation of Standards and Best Practices as illustrated at block 340. Each Standards and Best Practices Action taken is illustratively measured in units of time, money or accuracy. These performance indicator measurements are compared against like measurements across all enterprises in the market. The comparison is used to rank and score individual performance indicators.

A standards and best practices framework illustrated at block 342 drives optimal performance. The framework phases illustratively include needs assessment, baseline measurement, gap analysis, improvement execution, improvement validation, and business needs alignment. Standards and best practices profiles are related to specific practices within the seven disciplines of TEMM as illustrated at block 344. Illustratively, these profiles are created for each management practice.

Standards and best practices actions are processes and actions related to the standards and best practices profiles as illustrated at block 346. Work flow and process tasks address actions to be taken within each standard and best practice profile.

Performance indicators measuring operational, technical and financial performance are collected, calibrated and reported through the TEMOS Data Collector. Individual performance indicators measure the degree to which standards and best practices actions perform against a Market Excellence Scoring Scale. The Market Excellence Scoring Scale is powered by the TEMOS Data Collector and its measurement and comparison algorithms. Each measurement is compared against enterprise demographic profiles to create valid performance comparisons. Enterprise demographic profiles are housed in the Data Collector for reference and comparison. Enterprise demographic information such as industry, vertical market served, sales revenue, number of employees, physical location geography (North America, South America, Europe, Middle East, Africa, Asia Pacific), types of telecom technology deployed, cost of telecom services, and telecom service carriers utilized are used for normalizing and comparing enterprises against one another. Staff roles and responsibilities for each enterprise are also profiled so that performance can be measured against normalized staff functions.

Market Excellence is defined as scoring in the $90^{th}$ percentile or greater of all common values. Measurements are captured, date and time stamped, and aggregated over time. Individual Performance Indicator measures are dynamic, and will change as performance increases or declines for all enterprises in the market across all common Market Excellence measures. Individual enterprise measures are compared against all enterprises to determine Market Excellence Measures.

Standards & Best Practices Framework

FIG. 15 illustrates TEMOS methodology and process flow. AOTMP Standards & Best Practices are developed around a common framework that drives optimal performance. The framework illustratively includes the following phases:
1. Needs Assessment
2. Baseline Measurement
3. Gap Analysis
4. Improvement Execution
5. Improvement Validation
6. Business Needs Alignment Needs Assessment Block 320 of FIG. 15 illustrates a needs assessment. Enterprise business needs are most commonly motivated by the desire to drive cost of ownership down, while increasing performance capabilities. In the context of Telecom Environment Management needs, optimizing service-to-cost return is the ultimate objective of every enterprise. With this objective in mind, Needs Assessment is a discovery process used to identify, document and prioritize service, financial, operational and technical business objectives.

For example, a rapidly growing enterprise is likely to have the need to increase the quantity of voice, data and wireless services across the enterprise to accommodate staff expansion. Documentation of specific services, features and configurations for added staff is required to begin technology planning and sourcing initiatives. Beyond technical specifications, the cost of services is of interest. Determining the best overall cost of ownership for needed services is also required. Together, the practice of documenting technical service needs and cost of ownership needs (and limitations) supports needs prioritization against the overall objective of optimizing service-to-cost return.

Environment Baseline Measurement

Once a Needs Assessment has been completed at block 320, an Environment Baseline measurement is used to determine how success will be quantified upon completion as illustrated at block 322. Each enterprise need is measured against a current environment deficit. The Environment Baseline measurement allows standards & best practices practitioners to measure performance from a known state as needs are fulfilled. Current processes and process performance are identified at block 322.

Figure 9:
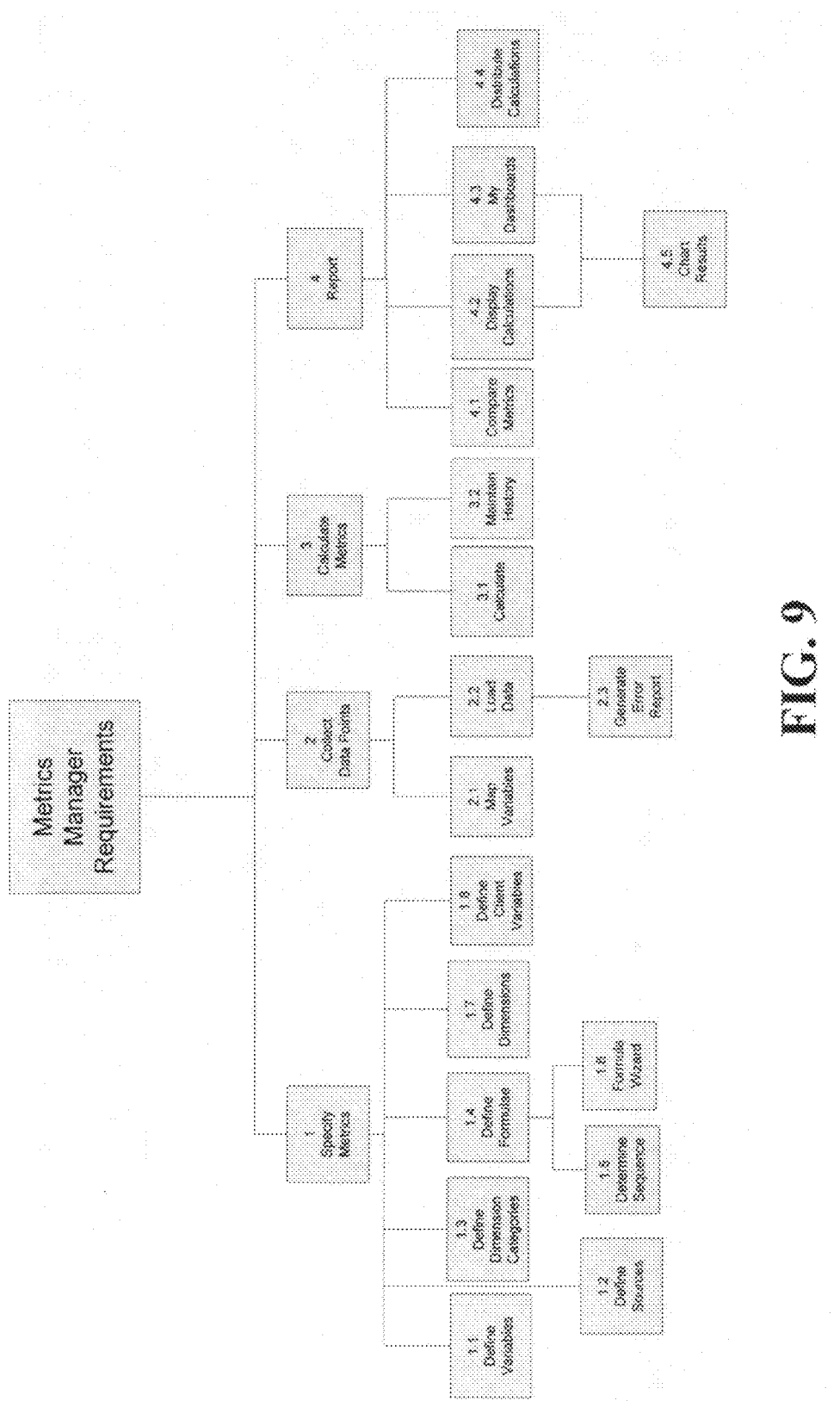

Seven areas of focus of the Telecom Environment Management Model (TEMM) are illustrated at block 324 of FIG. 9. Illustratively TEMM Areas of Focus are:
i. Resource Management
ii. Process Management
iii. Technical Management
iv. Asset Management
v. Project Management
vi. Relationship Management
vii. Financial Management Standards & Best Practices Profiles exist within each TEMM Area of Focus that:
  i. Define methodology for completing activities meeting AOTMP financial, operational and technical standards
  ii. Can be applied independent of systems or technology
  iii. Interlink to each other in a uniform fashion Gap Analysis Gap Analysis illustrated at blocks 326 and 328 is the practice of measuring the delta between an Environment Baseline measurement and AOTMP's Market Excellence measurement. The unit of measure for any specific gap analysis could be time, money or accuracy.

For example, an enterprise's need to improve service order performance requires a time to complete measurement. Measuring baseline time to complete a service order against AOTMP's Market Excellence time to complete measurement quantifies the performance gap. Gap Analysis can be performed against Market Peers and AOTMP's Market Excellence measures. Process gap analysis evaluates process gap between current and needs state as illustrated at block 326. Performance gap analysis evaluates performance gap between current and needs state as illustrated at block 328.

Improvement Execution

AOTMP Standards & Best Practices outline process designed and proven to yield optimal results when properly executed as illustrated at block 330. Improvement execution as illustrated at block 330 is designed to:
  a. Follow standards and best practices profiles
  b. Have performance indicators for improvement execution cycle
  c. Are quantifiable in financial, operational and technical terms
  d. Identify influence drivers for performance manipulation For example, the following is a standards & best practices process for ordering a business telephone line:
  1. Identify preferred local exchange carrier (LEC) and interexchange carrier (IXC).
  2. Establish preferred toll carrier codes (PIC/LPIC) with LEC on all new telephone numbers (TNs).
  3. Document all TNs and notify PIC carrier of TNs and account BTN along with install date.
  4. Define PIC provider account/sub-account structure for new TN traffic.
  5. Place intraLATA and interLATA toll voice calls on each TN to create toll traffic.
  6. Validate traffic billed from test calls on expected PIC provider invoice.
  7. Update service inventory with new TNs.

Performance Indicator Measurement

A Performance Indicator Measurement is illustrated at block 332 of FIG. 15. The Performance Indicator Measurement includes the following features:
  Defined methodology for measuring improvement cycle performance against initial/subsequent process and performance gap analysis
  Measurements are quantifiable in financial, operational and technical terms
  Influence drivers for performance manipulation are provided to aid performance objective attainment
  Measurements support front line/cost center stakeholders, telecom/IT stakeholders, and executive stakeholders Improvement Validation Improvement Validation is the practice of measuring pre-Improvement Execution performance and post-Improvement Execution performance. Should desired performance meet expectations identified during the Gap Analysis phase of the framework, further improvement is not required. Should desired performance fall short, the framework directs enterprises to return and repeat Needs Assessment and all subsequent phases. Results from initial performance indicator measurements drive improvement cycles until process and performance targets are achieved.

Business Needs Alignment

Business Needs Alignment is the practice of identifying changes in business needs. Enterprises should evaluate overall needs on a periodic basis. As enterprises change technology, engage in mergers and acquisitions, change technology strategies, change business models, and change service providers, specifics of change will alter needs. As such, Business Needs Alignment is an iterative Needs Assessment phase that serves to align needs with business objectives. Business Needs Alignment should occur annually at a minimum; however, shorter intervals may be required should business change increase in frequency. Business needs are monitored and adapted according to methodology.

Standards & Best Practices Examples

Example #1

TEM Vendor Selection Standards & Best Practices Profile

The goal of telecom expense management is to ensure an accurate and optimal service-to-cost return. A TEM program should optimize control over expenses, enterprise spending on telecom, and the operational costs associated with managing those expenses.

Central to AOTMP's TEM Supplier Selection Standards and Best Practices is methodology that promotes informed decision-making and success monitoring that will create desired and intended results. The standards and best practices outline five phases of TEM Supplier Selection:
  I. Needs Assessment
  II. Business Process Evaluation
  III. Business Case Development
  IV. TEM Supplier Sourcing
  V. Ratify the Business Case Needs Assessment
  Evaluate business objectives
  Evaluate operational objectives
  Evaluate financial objectives
  Evaluate technical objectives Business Process Evaluation
  Review workflow processes
  Evaluate process performance
  Determine objectives for performance improvements
  Perform process gap analysis Business Case Development
  Document current internal program costs
  Create financial cost justification requirements and model
  Evaluate dependencies and variables
  Develop a sustainability plan TEM Supplier Sourcing
  Develop specification that aligns with business, operational, financial and technical objectives
  Identify potential TEM Suppliers
  Solicit information
  Evaluate TEM Supplier compliance to needs Ratify the Business Case
  Finalize cost justification model
  Secure executive approval
  Document savings
  Implement success monitoring Example #2

Technology Selection Standards & Best Practices Profile

Technology selection considers the needs and objectives of individual users and organizations in the areas of business performance, operational performance, financial performance and technical performance. A technology selection project should address each area of performance to fully support project objectives and produce desired and predictable results.

Central to AOTMP's Technology Selection Standards and Best Practices is methodology that promotes informed decision-making and success monitoring that will create desired and intended results. The standards and best practices outline five phases of technology selection:

I. Needs Assessment
II. Technology Plan
III. Business Case Development
IV. Technology Sourcing
V. Ratify the Business Case Needs Assessment
  Evaluate business objectives
  Evaluate operational objectives
  Evaluate financial objectives
  Evaluate technical objectives
Technology Plan
  Evaluate user feature and capability requirements
  Evaluate technology compatibility requirements
  Determine objectives for technology performance
  Develop integration and migration plan
Business Case Development
  Document technology objectives
  Create financial cost justification requirements and model
  Evaluate dependencies and variables
  Develop a sustainability plan
Technology Sourcing
  Develop specification that aligns with business, operational, financial and technical objectives
  Identify potential technology suppliers
  Solicit information
  Evaluate technology supplier compliance to needs
Ratify the Business Case
  Finalize cost justification model
  Secure executive approval
  Document performance and financial benefits
  Implement success monitoring
Environment Management Model Summary In summary, AOTMP's Environment Management Model is based on a framework for managing a telecom environment across seven disciplines as discussed above and as illustrated in FIG. 16. Each area of discipline impacts the other areas, as well as the organization's overall ability to create an efficient and productive telecom environment. TEMOS considers the contributions and responsibilities across each of these disciplines in order to achieve the best possible return on telecom and IT services. Therefore, TEMOS provides a foundation for excellence in telecom environment management.

Figure 16:
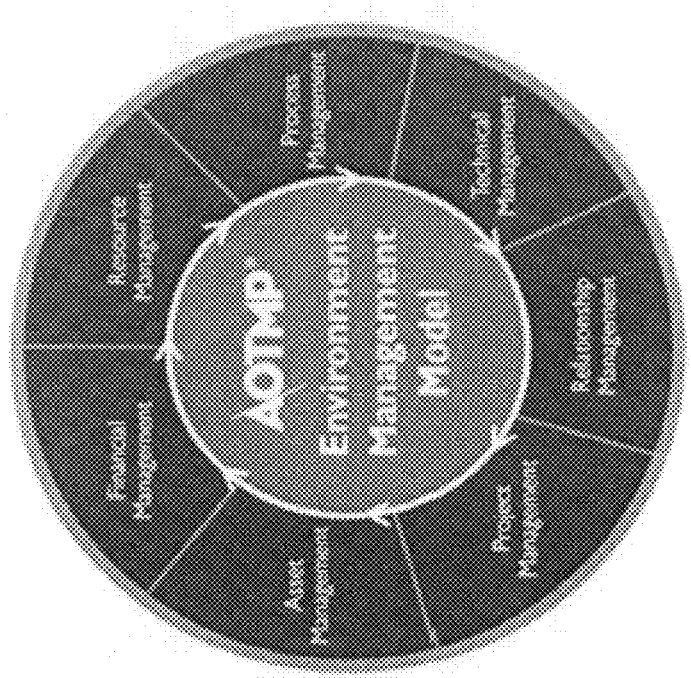
FIG. 16 is a diagram of the TEMOS Environment Management Model.
Figure 18:
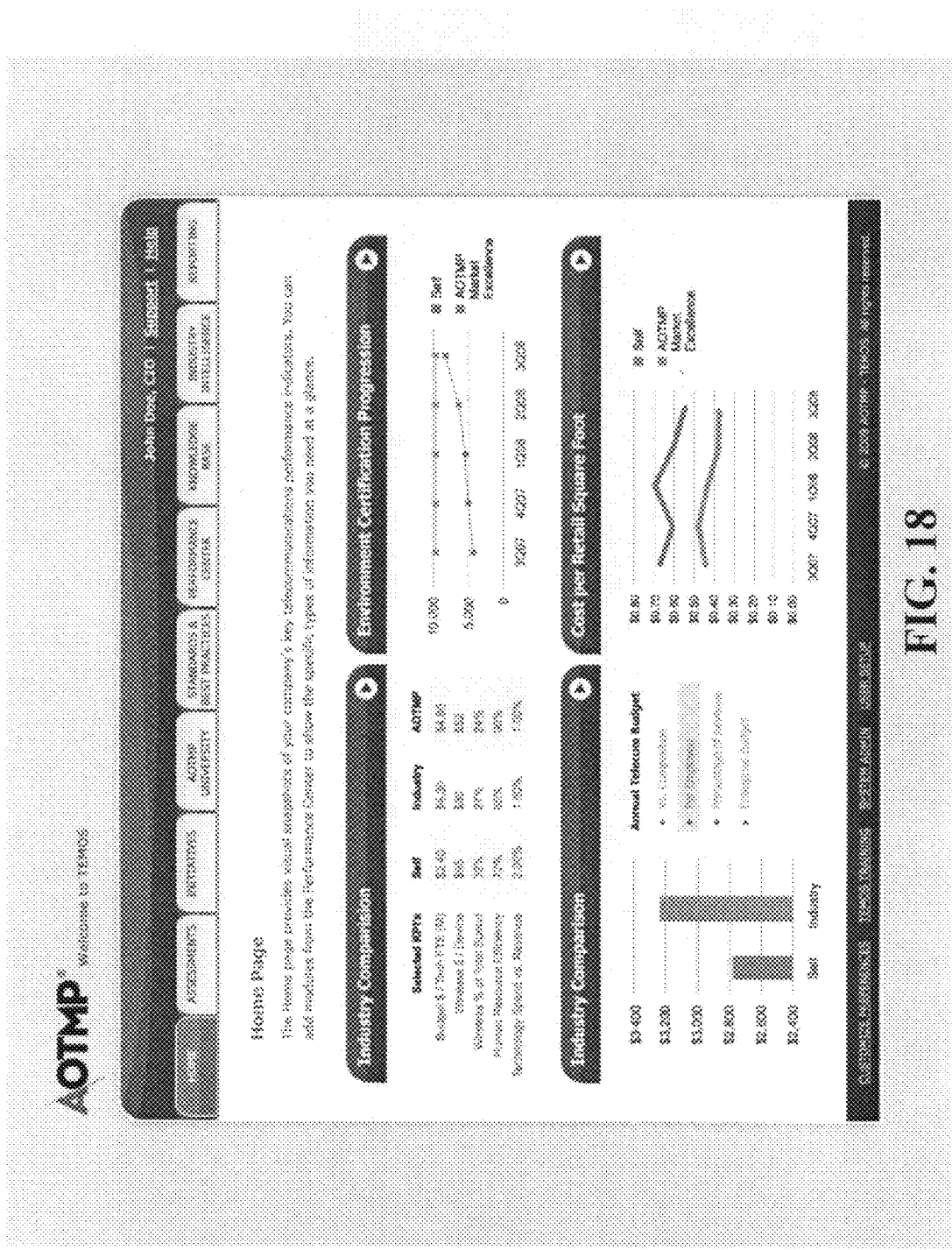
FIGS. 18-26 are illustrative screen shots displayed on a client's computer display during execution of TEMOS.
Figure 19:
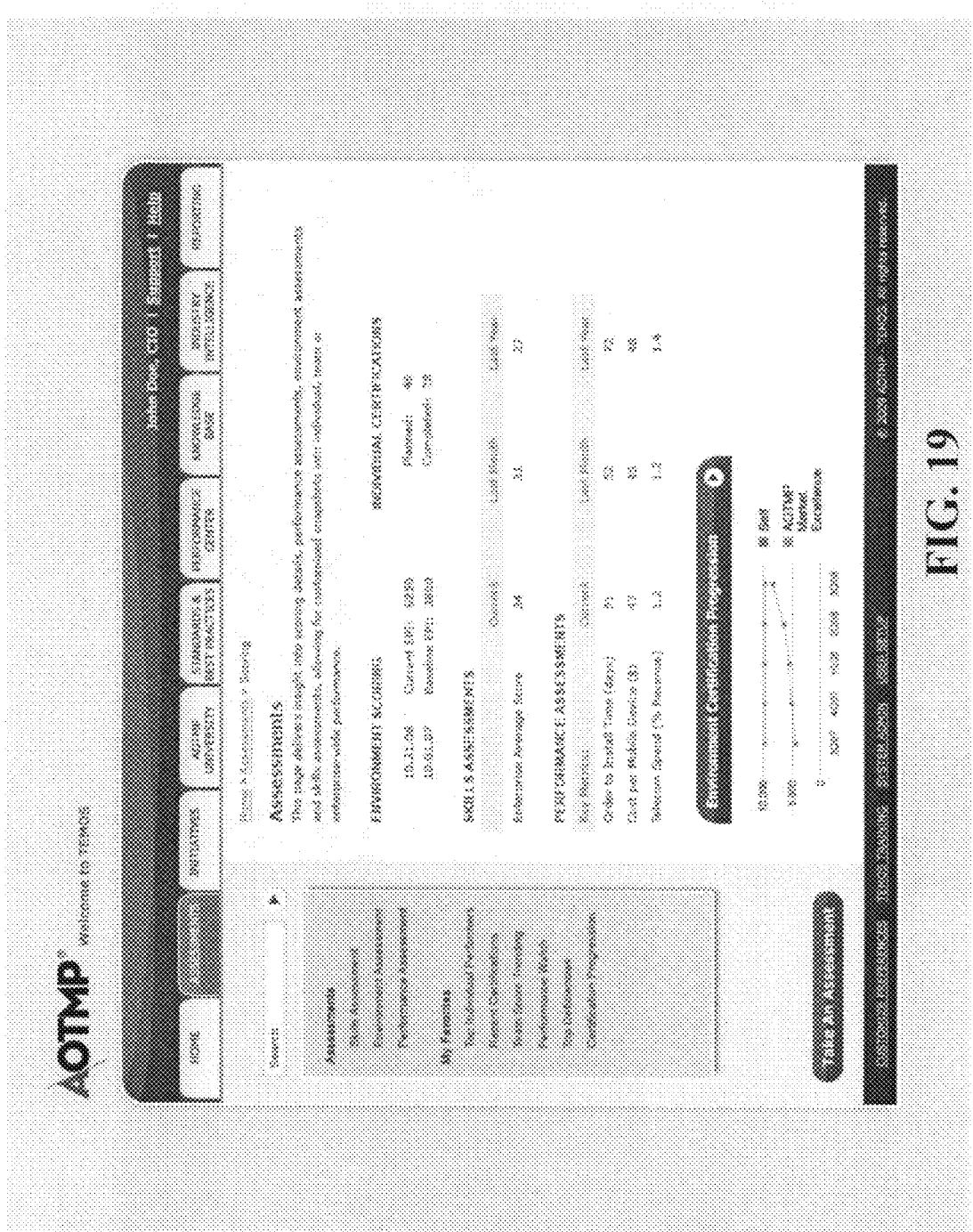
Figure 20:
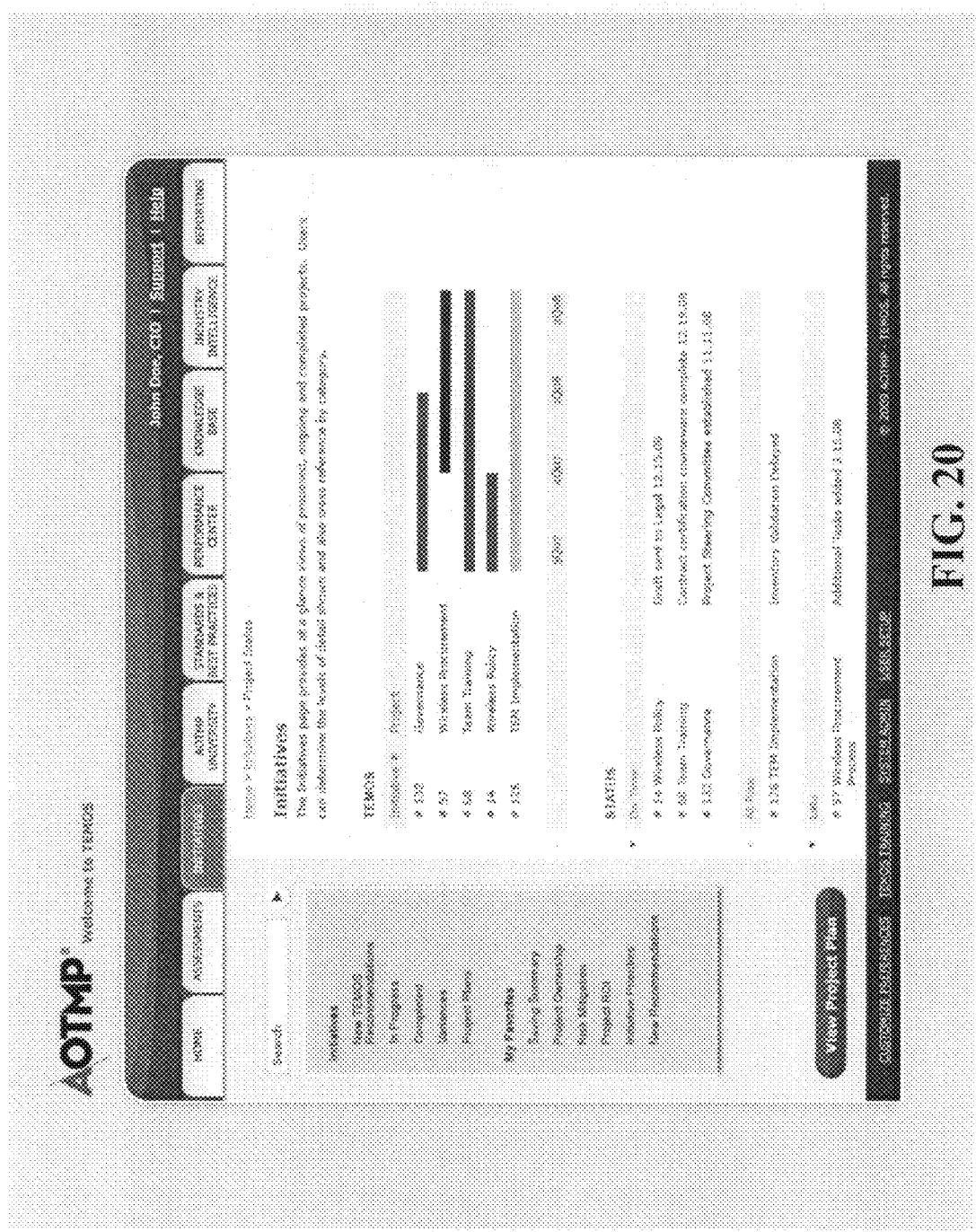
Figure 21:
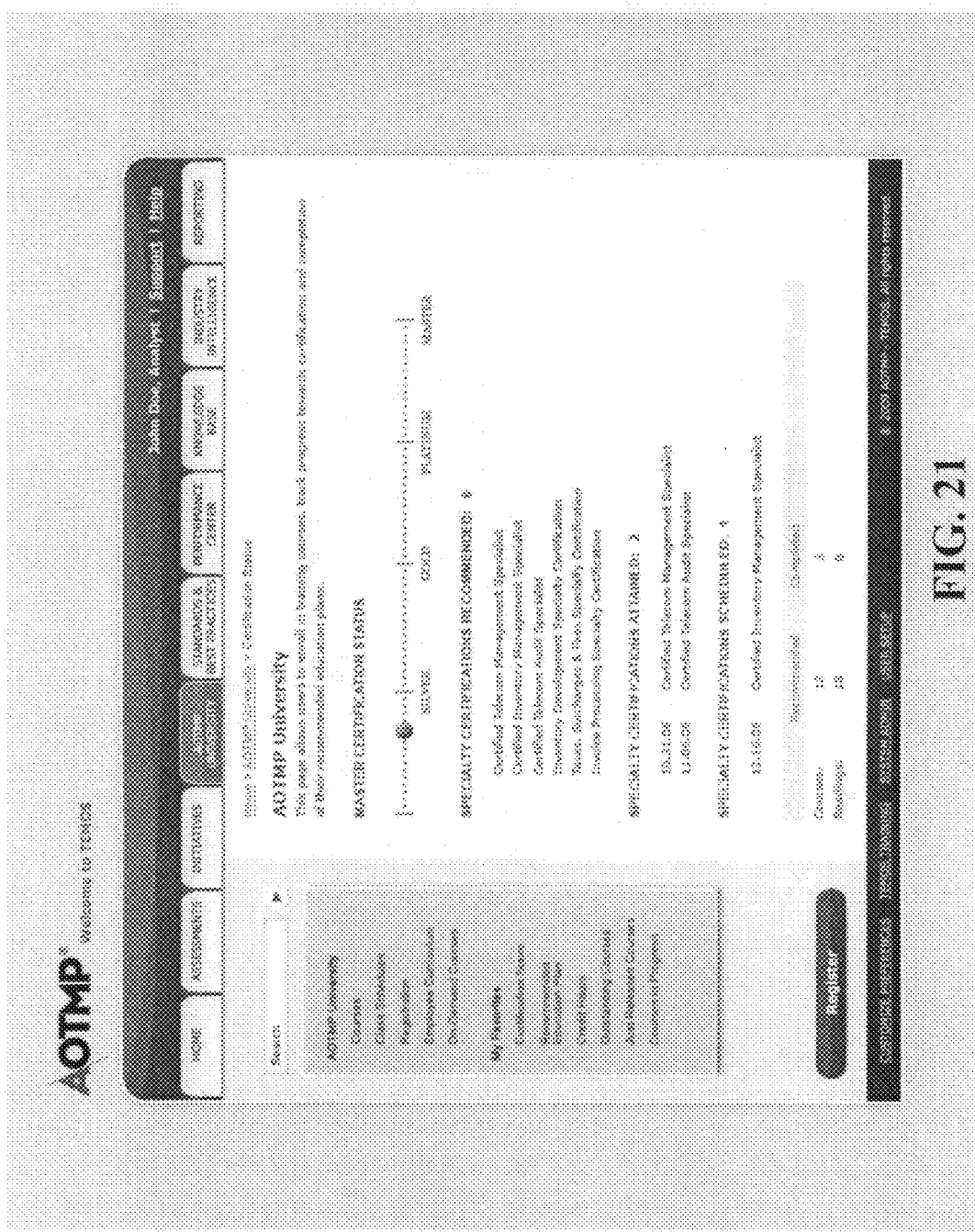
Figure 22:
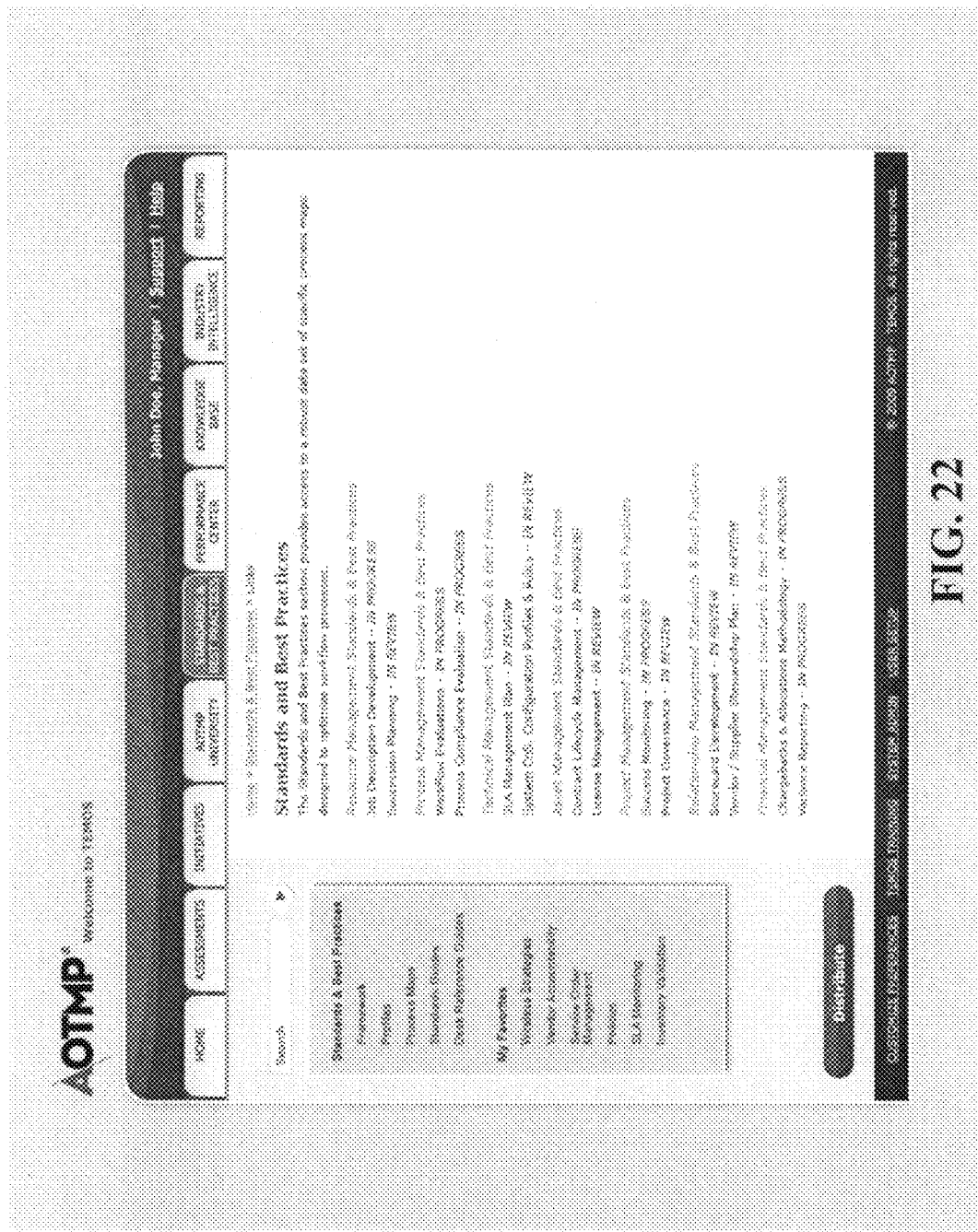
Figure 23:
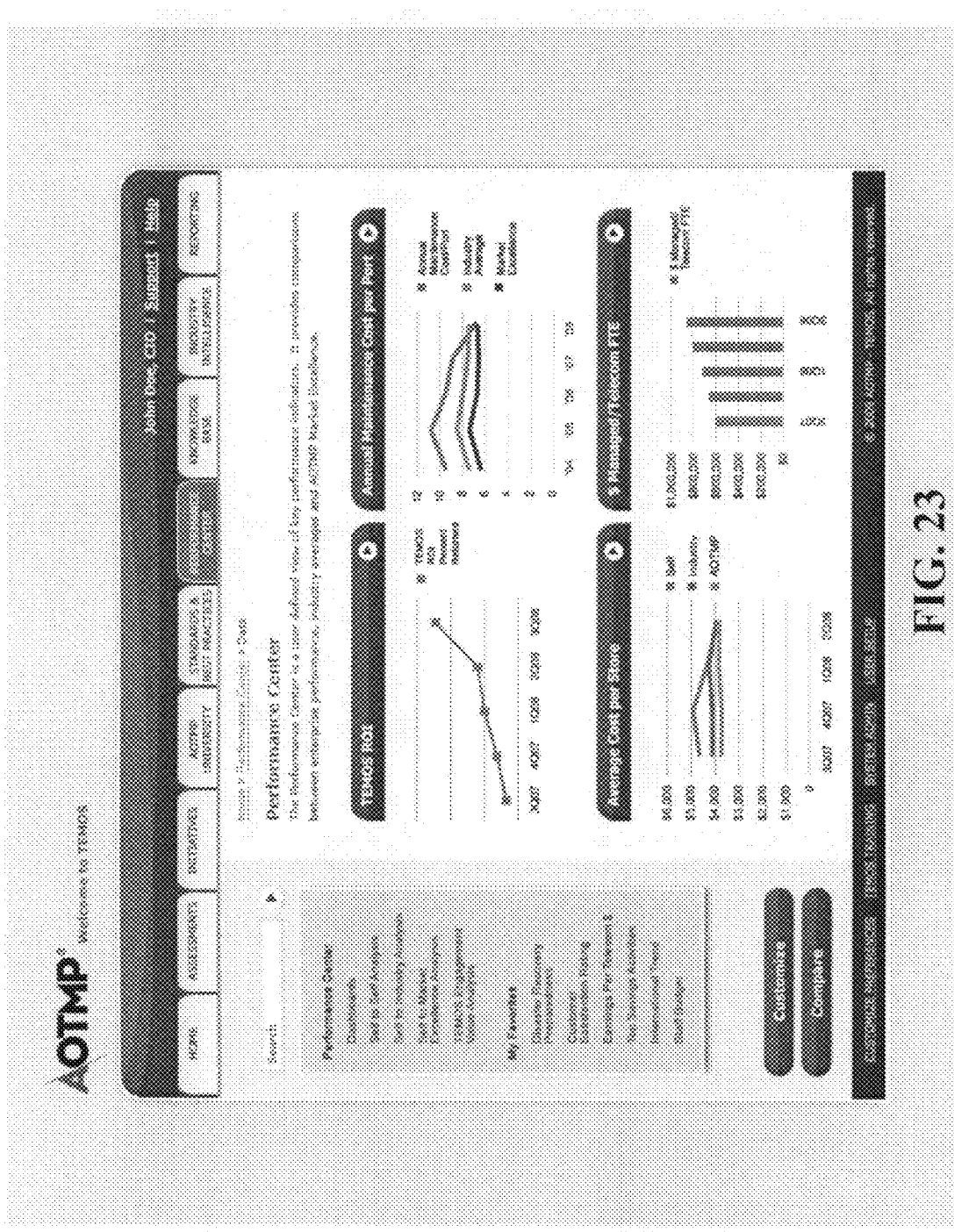
Figure 24:
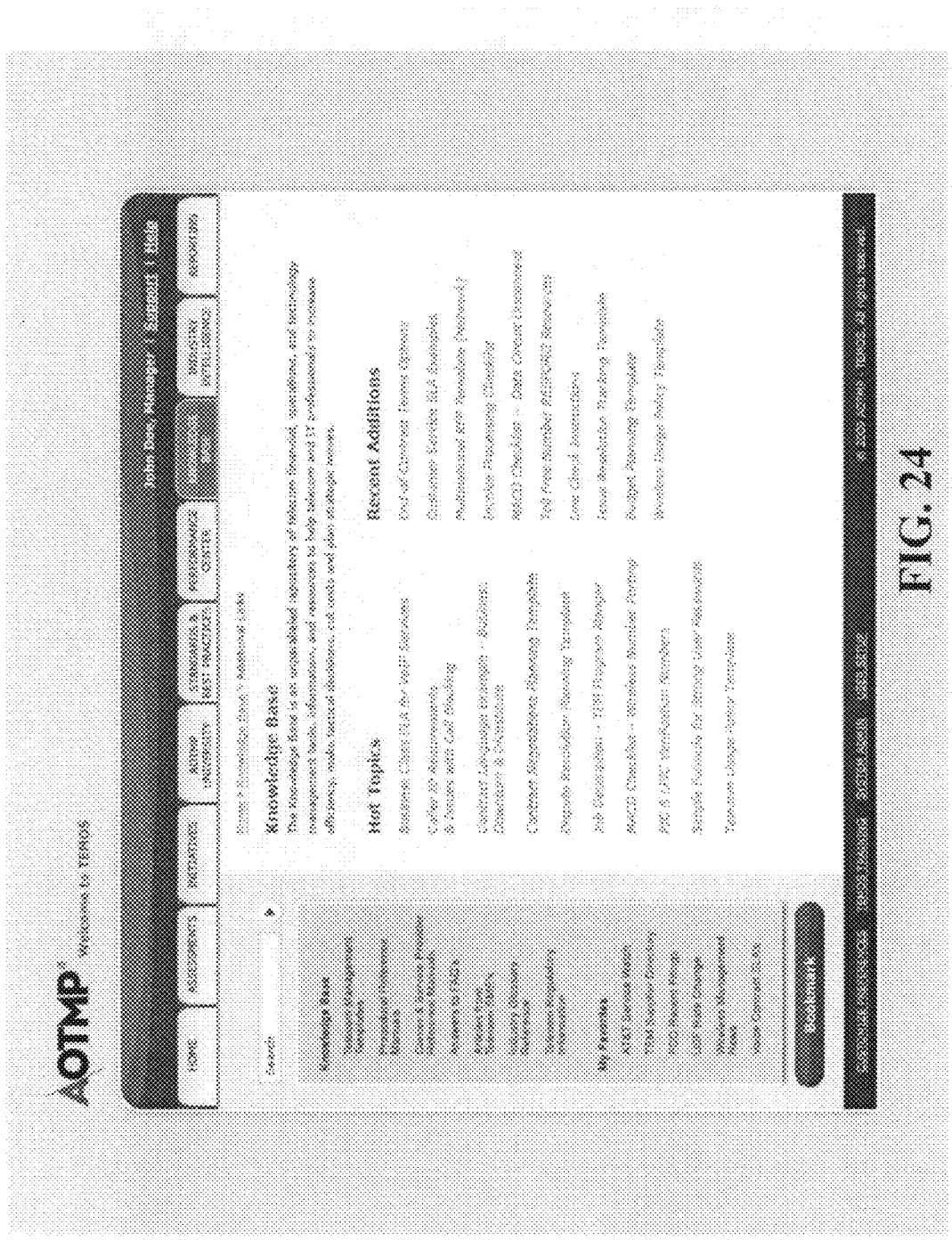
Figure 25:
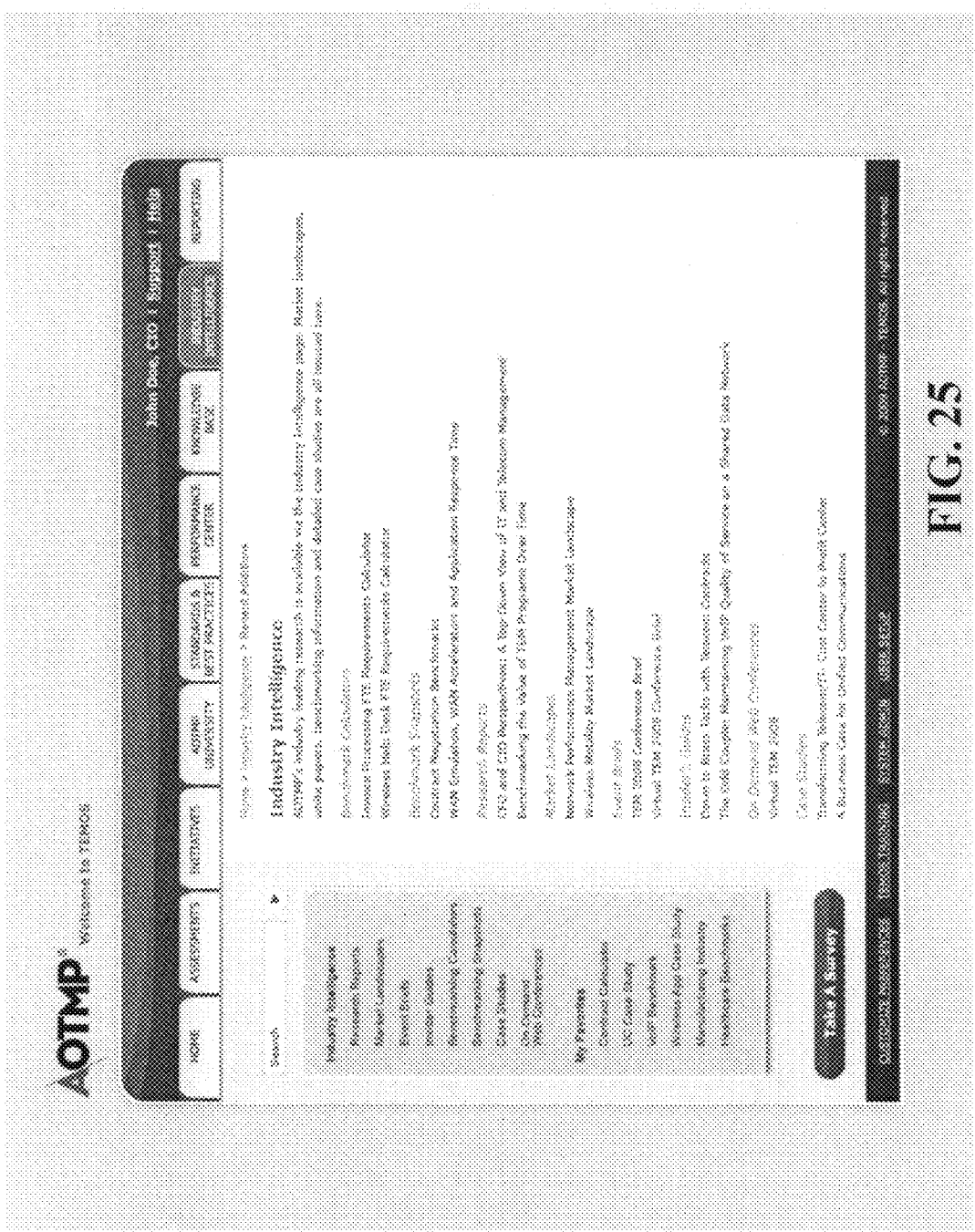
Figure 26:
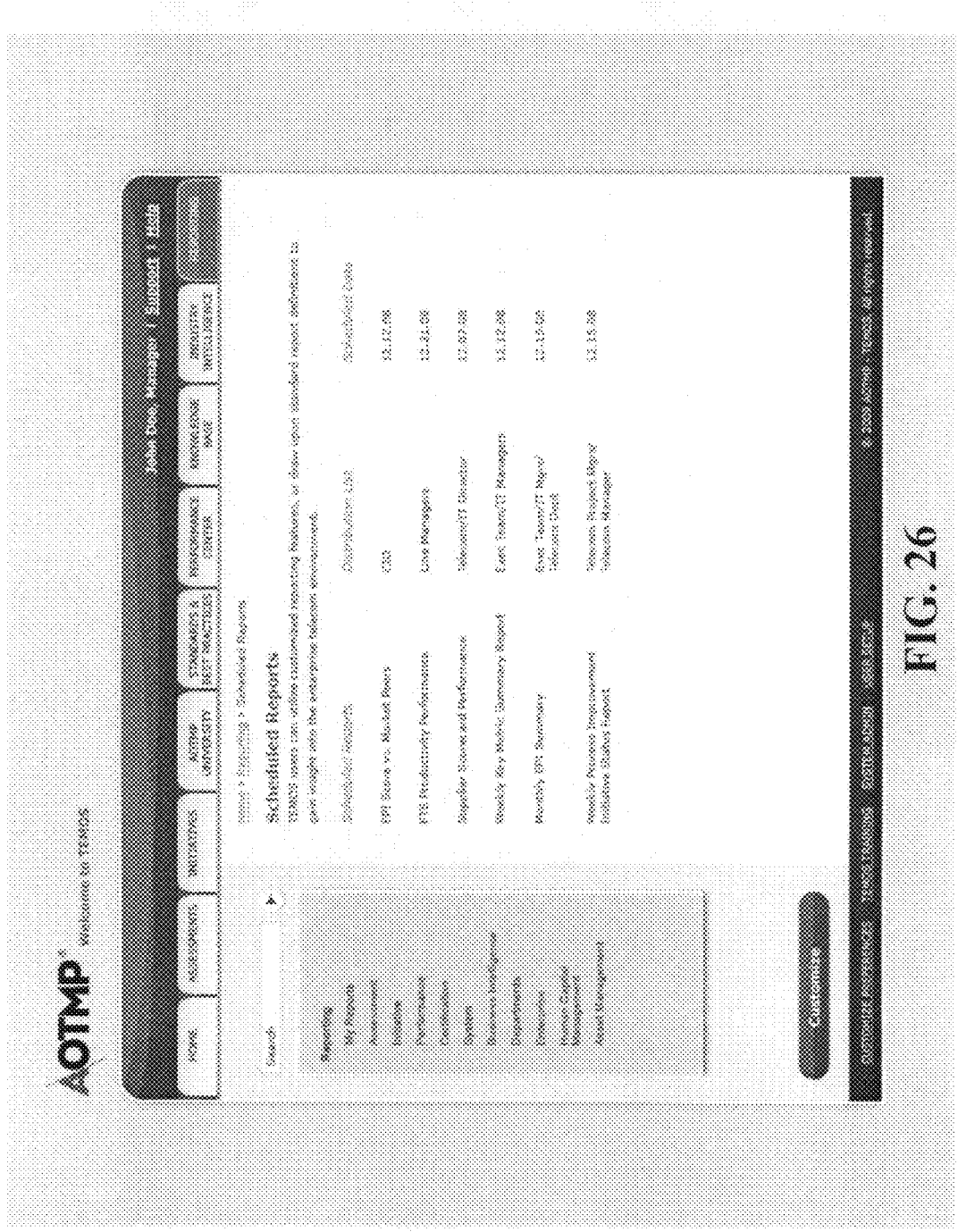

As illustrated in FIG. 16, the seven illustrated discipline areas of focus are:

Resource Management—Illustratively including human capital, development, and assignment.
Process Management—Illustratively including documentation, evaluation, maintenance, and improvements for process management.
Technical Management—Illustratively including design, implementation, maintenance, and repair activities.
Asset Management—Illustratively including equipment, services, licenses, and contract management.
Project Management—Illustratively including project structure, ownership, performance, and success monitoring.
Relationship Management—Illustratively including vendors, suppliers, carriers, and internal customer management and support processes.
Financial Management—Illustratively including budgeting, performance tracking, cost avoidance, cost containment, and cost optimization practices.

As an organization demands greater efficiency and increased productivity from its telecom and IT resources, identifying and understanding the organization's strengths and weaknesses is important. As discussed above, the telecommunications environment management operating system and method of the present disclosure compares and analyzes an organization's telecom and IT management practices against industry standards and best practices, and against the organization's peers.

The Performance Benchmark Program takes a top-down approach to overall telecom business strategy. Considering both short and long term business goals, a focus on key business drivers ensures that an organization's environment is continually working to support business goals and objectives. First, an organization's telecom environment is scored against AOTMP's Performance Index to establish an initial baseline. This is determined through an environment assessment, skills assessments, and evaluation of key performance indicators across the seven disciplines of AOTMP's Environment Management Model as discussed above.

This process identifies priorities for improvement, and the impact they have on the organization. Continuous improvement and re-evaluation of performance enables enterprises to measure telecom effectiveness across operational performance, as well as effectiveness and contribution to overall business objectives. Computer server 200 may provide a visual indication for display on client's computing device 120.

Executive Benchmark Report—Illustrates an organization's benchmarks and peer comparisons in the seven telecom environment management discipline areas, as well as impact of performance scores against business objectives.
Benchmark Detail Report—This report provides an organization's scoring details across the seven telecom environment management disciplines. In addition, recommendations for improving scores and performance may be outlined.

Figure 17:
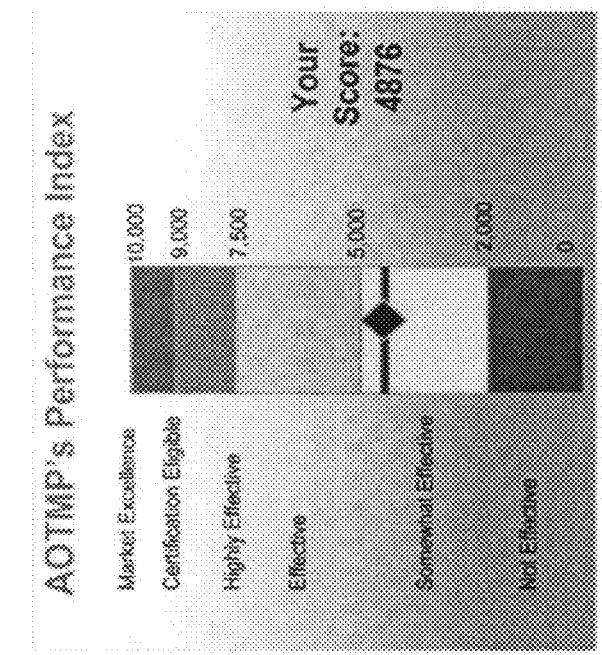
FIG. 17 is an illustrative display of the calculated Performance Index for an organization.

Sample scoring across AOTMP's seven disciplines of the Environment Management Model is as follows:

The TEMOS Environment Performance Index discussed above leverages the scoring algorithms discussed above to measure both predictive competencies using sets of individual and group assessments, and actual results through a set of robust performance indicators. TEMOS evaluates the effectiveness of an organization's management processes, and their impact across the seven discipline areas of the Environment Management Model discussed above. The resulting score represents the current state of the organization's telecom environment against AOTMP's standards and best practices Performance Index. Computer server 200 may provide a visual indication for display on client's computing device 120 as illustrated in FIG. 17.

FIGS. 18-26 are illustrative screen shots displayed on a client's computer display during execution of TEMOS.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A computer server implemented method for calculating a probability of optimal performance within a telecommunication environment for an organization, the computer server implemented method comprising:
    providing the computer server operably coupled to a computing device through a communication network;
    providing a memory accessible by the computer server;
    defining discipline areas, within a management model of the telecommunication environment, comprising at least: a resource management, a process management, a technical management, an asset management, a project management, a relationship management and a financial management of the telecommunication environment;
    defining standards and best practices across the discipline areas required to achieve the optimal performance within the telecommunication environment through a process flow comprising at least:
        a needs assessment used to identify, document and prioritize service, financial, operational and technical business objectives,
        an environment baseline measurement used to measure performance from a known state as needs are fulfilled,
        a gap analysis that evaluates a performance gap between current and needs state by measuring a delta between the environment baseline measurement and a market excellence measurement,
        an improvement execution designed to identify influence drivers for performance manipulation,
        a performance indicator measurement to provide the influence drivers for performance manipulation,
        an improvement validation for measuring pre-improvement execution performance and post-improvement execution performance and to direct the organization to repeat the needs assessment, the environment baseline, the gap analysis, the improvement execution and the performance indicator measurement when a desired performance falls short of expectations identified in the gap analysis phase, and
        a business needs alignment for periodically identifying changes in business needs;
    receiving at least three evaluation cycles, wherein the at least three evaluation cycles are consecutive and time contiguous;
    automatically generating and sending, a plurality skill assessment questions from the computer server to the computing device, the plurality of skill assessment questions being selected to assess knowledge and skills of the standards and best practices by a plurality of people in the organization and to provide a predictive indicator as to whether the plurality of people questioned within the organization have the knowledge and skills of the standards and best practices required to achieve optimal telecommunication performance results;
    receiving with the computer server a first plurality of answers to the plurality of skill assessment questions from the computing device;
    automatically calculating by the computer server, skill assessment scores for the organization for each of the at least three evaluation cycles from the first plurality of received answers to the plurality of skill assessment questions based on the defined discipline areas;
    automatically generating and sending a plurality of environment assessment questions related to telecommunications infrastructure and processes of the organization, from the computer server to the computing device, the plurality of environment assessment questions being selected to provide another predictive indicator as to whether the organization has the telecommunications infrastructure and processes in sufficiency to achieve optimal telecommunication performance results;
    automatically receiving with the computer server a second plurality of answers to the plurality of environment assessment questions from a plurality of individual respondents from the computing device;
    automatically calculating by the computer server an environment assessment score for the organization for each of the at least three evaluation cycles from the second plurality of received answers to the environment assessment questions based on the defined discipline areas, wherein the environment assessment score is calculated by mathematically weighting the second plurality of answers to the environment assessment questions relative to a responsibility within the organization of each individual respondent and then averaging the weighted scores across the plurality of the individual respondents;
    automatically calculating by the computer server a performance assessment score based on the defined discipline areas;
    automatically aggregating by the computer server the calculated skills assessment score, the calculated performance assessment score, and the calculated environmental assessment score to further calculate aggregated environment performance index scores for each of the at least three evaluation cycles for the organization; and
    averaging by the computer server the aggregated environment performance index scores from each of the at least three evaluation cycles to indicate the probability of optimal telecommunications performance in the telecommunication environment for the organization.

2. The computer server implemented method of claim 1, further comprising providing performance measurements from the computer server to the computing device for outputting on a display of the computing device.

3. The method of claim 2, further comprising providing other performance measurements from at least one peer organization from the computer server to the computing device for outputting on the display of the computing device.

4. The method of claim 1, wherein the performance assessment score is a numerical score.

5. The method of claim 1, further comprising
    automatically determining whether the organization qualifies for a certification of optimal performance within the telecommunication environment based on the averaged aggregated environment performance index scores from each of the at least three evaluation cycles; and
    issuing the certification of optimal performance within the telecommunication environment to the organization when the organization qualifies for the certification of optimal performance within the telecommunication environment.

6. The method of claim 5, wherein the step of automatically determining whether the organization qualifies for the certification of optimal performance based on the averaged aggregated environment performance index scores from each of the at least three evaluation cycles, further comprises,
   determining whether the organization achieves at least a predetermined environment performance index score across the at least three evaluation cycles.

7. The method of claim 5, further comprising periodically determining whether the certified organization qualifies for a recertification.

8. The method of claim 1, wherein the responsibility is selected from a group comprising: a results responsibility for management oversight over execution of a related process, a direct responsibility for a functional role for execution of the related process, an indirect responsibility for a functional role for the related process, and no responsibility for the related process, according to a scope qualifying question.

9. A system for calculating a probability of optimal performance within a telecommunication environment for an organization, the system comprising: a computer server equipped with a non-transitory computer readable memory and coupled to a computing device through a communication network, the computer server programmed for:
   defining discipline areas, within a management model of the telecommunication environment, comprising at least: a resource management, a process management, a technical management, an asset management, a project management, a relationship management and a financial management of the telecommunication environment;
   defining standards and best practices across the discipline areas required to achieve the optimal performance within the telecommunication environment through a process flow comprising at least:
      a needs assessment used to identify, document and prioritize service, financial, operational and technical business objectives,
      an environment baseline measurement used to measure performance from a known state as needs are fulfilled,
      a gap analysis that evaluates a performance gap between current and needs state by measuring a delta between the environment baseline measurement and a market excellence measurement,
      an improvement execution designed to identify influence drivers for performance manipulation,
      a performance indicator measurement to provide the influence drivers for performance manipulation,
      an improvement validation for measuring pre-improvement execution performance and post-improvement execution performance and to direct the organization to repeat the needs assessment, the environment baseline, the gap analysis, the improvement execution and the performance indicator measurement when a desired performance falls short of expectations identified in the gap analysis phase, and
      a business needs alignment for periodically identifying changes in business needs;
   receiving at least three evaluation cycles, wherein the at least three evaluation cycles are consecutive and time contiguous;
   automatically generating and sending, a plurality skill assessment questions to the computing device, the plurality of skill assessment questions being selected to assess knowledge and skills of the standards and best practices by a plurality of people in the organization and to provide a predictive indicator as to whether the plurality of people questioned within the organization have the knowledge and skills of the standards and best practices required to achieve optimal telecommunication performance results;
   receiving a first plurality of answers to the plurality of skill assessment questions from the computing device;
   automatically calculating skill assessment scores for the organization for each of the at least three evaluation cycles from the first plurality of received answers to the plurality of skill assessment questions based on the defined discipline areas;
   automatically generating and sending a plurality of environment assessment questions related to telecommunications infrastructure and processes of the organization, to the computing device, the plurality of environment assessment questions being selected to provide another predictive indicator as to whether the organization has the telecommunications infrastructure and processes in sufficiency to achieve optimal telecommunication performance results;
   automatically receiving a second plurality of answers to the plurality of environment assessment questions from a plurality of individual respondents from the computing device;
   automatically calculating an environment assessment score for the organization for each of the at least three evaluation cycles from the second plurality of received answers to the environment assessment questions based on the defined discipline areas, wherein the environment assessment score is calculated by mathematically weighting the second plurality of answers to the environment assessment questions relative to a responsibility within the organization of each individual respondent and then averaging the weighted scores across the plurality of the individual respondents;
   automatically calculating a performance assessment score based on the defined discipline areas;
   automatically aggregating the calculated skills assessment score, the calculated performance assessment score, and the calculated environmental assessment score to further calculate aggregated environment performance index scores for each of the at least three evaluation cycles for the organization; and
   averaging the aggregated environment performance index scores from each of the at least three evaluation cycles to indicate the probability of optimal telecommunications performance in the telecommunication environment for the organization.

10. The system of claim 9, wherein the computer server is further programmed to provide performance measurements from the computer server to the computing device for outputting on a display of the computing device.

11. The system of claim 10, wherein the computer server is further programmed to provide other performance measurements from at least one peer organization from the computer server to the computing device for outputting on the display of the computing device.

12. The system of claim 9, wherein the computer server is further programmed to calculate the performance assessment score as a numerical score.

13. The system of claim 9, wherein the computer server is further programmed to
   determine whether the organization qualifies for a certification of optimal performance within the telecommunication environment based on the averaged aggregated environment performance index scores from each of the at least three evaluation cycles, and to issue the certification of optimal performance within the telecommunication environment to the organization when the organization qualifies for the certification of optimal performance within the telecommunication environment.

14. The system of claim 13, wherein the computer server is further programmed to determine whether the organization achieves at least a predetermined environment performance index score across the three evaluation cycles.

15. The system of claim 13, wherein the computer server is further programmed to periodically determine whether the certified organization qualifies for a recertification.

16. The system of claim 9, wherein the computer server is further programmed to select the responsibility from a group comprising: a results responsibility for management oversight over execution of a related process, a direct responsibility for a functional role for execution of the related process, an indirect responsibility for a functional role for the related process, and no responsibility for the related process, according to a scope qualifying question.

* * * * *